(12) United States Patent
Kim

(10) Patent No.: US 9,426,496 B2
(45) Date of Patent: *Aug. 23, 2016

(54) METHOD AND APPARATUS FOR ENTROPY CODING VIDEO AND METHOD AND APPARATUS FOR ENTROPY DECODING VIDEO

(71) Applicant: SAMSUNG ELECTRONICS CO., LTD., Suwon-si (KR)

(72) Inventor: Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,045

(22) Filed: Mar. 12, 2015

(65) Prior Publication Data

US 2015/0195584 A1  Jul. 9, 2015

Related U.S. Application Data

(63) Continuation of application No. 14/362,771, filed as application No. PCT/KR2013/005870 on Jul. 2, 2013.

(60) Provisional application No. 61/667,117, filed on Jul. 2, 2012.

(51) Int. Cl.
*H04N 19/18* (2014.01)
*H04N 19/91* (2014.01)
(Continued)

(52) U.S. Cl.
CPC ........ *H04N 19/91* (2014.11); *H04N 19/00121* (2013.01); *H04N 19/119* (2014.11); *H04N 19/13* (2014.11); *H04N 19/139* (2014.11); *H04N 19/157* (2014.11); *H04N 19/159* (2014.11);
(Continued)

(58) Field of Classification Search
CPC ...................................................... H04N 19/18
See application file for complete search history.

(56) References Cited

U.S. PATENT DOCUMENTS 7,599,438 B2 * 10/2009 Holcomb ............... H04N 19/70
 375/240.23
7,664,176 B2 * 2/2010 Bao ..................... H04N 19/176
 375/240.08

(Continued)

FOREIGN PATENT DOCUMENTS

JP 2009-177356 A 8/2009
JP 2011-24001 A 2/2011

(Continued)

OTHER PUBLICATIONS

Google Patent history log.*

(Continued)

*Primary Examiner* — William C Vaughn, Jr.
*Assistant Examiner* — Luis Perez Fuentes
(74) *Attorney, Agent, or Firm* — Sughrue Mion, PLLC

(57) ABSTRACT

Provided are entropy decoding and encoding methods of a video. The entropy decoding method includes obtaining a transformation unit significant coefficient flag indicating whether a non-zero transformation coefficient exists in the transformation unit, from a bitstream, determining a context model for arithmetically 5 decoding the transformation unit significant coefficient flag, based on the transformation depth of the transformation unit and arithmetically decoding the transformation unit significant coefficient flag based on the determined context model.

1 Claim, 19 Drawing Sheets

(51) Int. Cl.
*H04N 19/139* (2014.01)
*H04N 19/13* (2014.01)
*H04N 19/119* (2014.01)
*H04N 19/46* (2014.01)
*H04N 19/44* (2014.01)
*H04N 19/60* (2014.01)
*H04N 19/176* (2014.01)
*H04N 19/157* (2014.01)
*H04N 19/159* (2014.01)

(52) U.S. Cl.
CPC ............ *H04N 19/176* (2014.11); *H04N 19/18* (2014.11); *H04N 19/44* (2014.11); *H04N 19/46* (2014.11); *H04N 19/60* (2014.11)

(56) References Cited

U.S. PATENT DOCUMENTS

| | | | | |
|---|---|---|---|---|
| 8,515,194 | B2* | 8/2013 | Srinivasan | H04N 19/176 382/232 |
| 8,792,561 | B2* | 7/2014 | Min | H04N 19/139 375/240 |
| 8,811,479 | B2* | 8/2014 | Cheon | H04N 19/00533 375/240.12 |
| 8,885,727 | B2* | 11/2014 | Lee | H04N 19/137 375/240.24 |
| 8,942,282 | B2* | 1/2015 | Karczewicz | H04N 19/159 345/629 |
| 8,976,861 | B2* | 3/2015 | Rojals | H03M 7/4018 375/240.02 |
| 9,256,960 | B2* | 2/2016 | Sasai | G06T 9/00 |
| 9,300,957 | B2 | 3/2016 | Cheon et al. | |
| 2005/0053143 | A1 | 3/2005 | Holcomb et al. | |
| 2009/0225861 | A1 | 9/2009 | Sato et al. | |
| 2011/0038422 | A1 | 2/2011 | Cheon et al. | |
| 2011/0170012 | A1 | 7/2011 | Cheon et al. | |
| 2011/0170610 | A1 | 7/2011 | Min et al. | |
| 2011/0228858 | A1 | 9/2011 | Budagavi et al. | |
| 2011/0249721 | A1 | 10/2011 | Karczewicz et al. | |
| 2012/0099646 | A1* | 4/2012 | Coban | H04N 19/176 375/240.12 |
| 2012/0320976 | A1 | 12/2012 | Suzuki et al. | |
| 2013/0114731 | A1 | 5/2013 | Lee et al. | |
| 2013/0322774 | A1* | 12/2013 | Sasai | G06T 9/00 382/239 |
| 2014/0314149 | A1 | 10/2014 | Cheon et al. | |
| 2015/0117546 | A1* | 4/2015 | Kim | H04N 19/18 375/240.18 |
| 2015/0195539 | A1 | 7/2015 | Lee et al. | |
| 2015/0245077 | A1 | 8/2015 | Lim et al. | |

FOREIGN PATENT DOCUMENTS

| | | |
|---|---|---|
| KR | 10-2009-0130302 A | 12/2009 |
| KR | 10-2011-0017721 A | 2/2011 |
| KR | 10-2011-0046016 A | 5/2011 |
| KR | 10-2012-0005984 A | 1/2012 |
| RU | 2 391 794 C2 | 6/2010 |
| TW | 201016010 A1 | 4/2010 |
| TW | 201137858 A1 | 11/2011 |
| WO | 2011/019249 A2 | 2/2011 |
| WO | 2011/087295 A2 | 7/2011 |
| WO | 2011/130334 A2 | 10/2011 |
| WO | 2012/005551 A2 | 1/2012 |
| WO | 2012/044104 A2 | 4/2012 |
| WO | 2012/061298 A1 | 5/2012 |
| WO | 2012/134246 A2 | 10/2012 |
| WO | 2013/005968 A2 | 1/2013 |

OTHER PUBLICATIONS

Communication from the Korean Intellectual Property Office dated Mar. 13, 2015 in a counterpart Korean application No. 10-2014-0059299.

Communication from the Korean Intellectual Property Office dated Mar. 13, 2015 in a counterpart Korean application No. 10-2014-0115475.

International Search Report, dated Oct. 23, 2013, issued by the International Searching Authority in counterpart International Application No. PCT/KR2013/005870 (PCT/ISA/210).

Written Opinion, dated Oct. 23, 2013, issued by the International Searching Authority in counterpart International Application No. PCT/KR2013/005870 (PCT/ISA/237).

Benjamin Bross et al., "WD4: Working Draft4 of High-Efficiency Video Coding", JCT-VC of ITU-T SG16 WP3 and ISO/IEC JTC1/SC29/WG11, Jul. 14-22, 2011, JCTVC-F803.

Communication dated May 30, 2014 issued by the Korean Intellectual Property Office in counterpart Korean Patent Application No. 10-2013-0077301.

Communication dated Oct. 13, 2014 issued by the Korean Intellectual Property Office in counterpart Korean Patent Application No. 10-2013-0077301.

Communication dated Dec. 11, 2014 issued by the Korean Intellectual Property Office in counterpart Korean Patent Application No. 10-2014-0059299.

Communication dated Dec. 11, 2014 issued by the Korean Intellectual Property Office in counterpart Korean Patent Application No. 10-2014-0115475.

Communication from the Australian Patent Office issued Sep. 17, 2015 in a counterpart Australian Application No. 2013285752.

Communication dated Dec. 14, 2015 issued by European Patent Office in counterpart European Patent Application No. 13813478.8.

Communication dated Jan. 22, 2016 issued by European Patent Office in counterpart European Patent Application No. 13 813 478.8.

Bross et al., "High efficiency video coding (HEVC) text specification draft 7", Joint Collaborative Team on Video Coding (JCT-VC) of ITU-T SG16 WP3 and ISO/IEC JTC1/SC29/WG11, Apr. 27-May 7, 2012, 268 pages total, 9th Meeting, Geneva, CH, JCTVC-I1003_d0.

Kim et al., "Simplification on context derivation of cbf_luma syntax element", Joint Collaborative Team on Video Coding (JCT-VC) of ITU-T SG 16 WP3 and ISO/IEC JTC 1/SC 29/WG 11, Jul. 11-20, 2012, 3 pages total, 10th Meeting, Samsung Electronics Co., Ltd., Stockholm, SE, JCTVC-J0303.

Communication dated Mar. 8, 2016 issued by the Japanese Patent Office in counterpart Japanese Patent Application No. 2015-520057.

Xiaoyin Che et al; "Enhanced Context Modeling for Skip and Split Flag"; Joint Collaborative Team on Video Coding (JCT-VC) of ITU-T SG16 WP3 and ISO/IEC JTC1/SC29/WG11; 4th Meeting: Daegu, KR; Jan. 20-28, 2011; Document: JCTVC-D254; pp. 1-4.

Communication dated May 4, 2016 issued by the Russian Patent Office in counterpart Russian Patent Application No. 2015102988.

Communication dated Apr. 14, 2016 issued by the Taiwanese Patent Office in counterpart Taiwanese Patent Application No. 102123712.

* cited by examiner

CODING UNIT (1010)

FIG. 21

SigMap (2100)

| 1 | 1 | 1 | 1 |
|---|---|---|---|
| 1 | 1 | 1 | 1 |
| 1 | 1 | 1 | 0 |
| 1 | 1 | 1 | 0 |

FIG. 22 coeff_abs_level_greater1_flag (2200)

| 1 | 1 | 1 | 1 |
|---|---|---|---|
| 1 | 1 | 1 | 1 |
| 1 | 0 | 1 |   |
| 1 | 1 | 1 |   |

2210

FIG. 23 coeff_abs_level_greater2_flag (2300)

| 1 | 1 | 1 | 1 |
|---|---|---|---|
| 1 | 1 | 1 | 1 |
| 1 |   | 1 |   |
| 1 | 0 | 1 |   |

2310

FIG. 24 coeff_abs_level_remaining_flag (2400)

| 8 | 5 | 4 | 3 |
|---|---|---|---|
| 8 | 4 | 3 | 3 |
| 5 |   | 12 |   |
| 3 |   | 0 |   |

METHOD AND APPARATUS FOR ENTROPY CODING VIDEO AND METHOD AND APPARATUS FOR ENTROPY DECODING VIDEO

This application is a continuation of U.S. application Ser. No. 14/362,771, filed Jun. 4, 2014, which is a 371 National Stage Application of PCT/KR2013/005870, filed on Jul. 2, 2013, which claims benefit of U.S. Provisional Application No. 61/667,117, filed on Jul. 2, 2012, all the disclosures of which are incorporated herein in their entireties by reference.

BACKGROUND

1. Field

Exemplary embodiments relate to video encoding and decoding. In particular, exemplary embodiments relate to a method and apparatus for entropy encoding and decoding information related to a transformation unit.

2. Related Art

According to image compression methods such as MPEG-1, MPEG-2, or MPEG-4 H.264/MPEG-4 advanced video coding (AVC), an image is split into blocks having a predetermined size. Then, residual data of the blocks are obtained by inter prediction or intra prediction. Residual data is compressed by transformation, quantization, scanning, run length coding, and entropy coding. In entropy coding, a syntax element such as a transformation coefficient or a prediction mode is entropy encoded to output a bitstream. A decoder parses and extracts syntax elements from a bitstream, and reconstructs an image based on the extracted syntax elements.

SUMMARY

Exemplary embodiments may include an entropy encoding method and apparatus, and an entropy decoding method and apparatus for selecting a context model used to entropy encode and decode a syntax element related to a transformation unit that is a data unit used to transform a coding unit, based on a transformation depth indicating a hierarchical splitting relationship between the coding unit and the transformation unit.

A context model for arithmetically decoding a transformation unit significant coefficient flag is determined based on a transformation depth indicating the number of times the coding unit is split to determine the transformation unit included in the coding unit, and the transformation unit significant coefficient flag is arithmetically decoded based on the determined context model.

According to exemplary embodiments, by selecting a context model based on a transformation depth, a condition for selecting the context model may be simplified and operation for entropy encoding and decoding may also be simplified.

According to an aspect of an exemplary embodiment, an entropy decoding method of a video is provided, the method includes determining a transformation unit which is included in a coding unit and is used to inversely transform the coding unit; obtaining a transformation unit significant coefficient flag from a bitstream which indicates whether a non-zero transformation coefficient exists in the transformation unit; determining a context model for arithmetically decoding the transformation unit significant coefficient flag based on a transformation depth of the transformation unit in response to a number of times the coding unit is split when determining the transformation unit being the transformation depth of the transformation unit; and arithmetically decoding the transformation unit significant coefficient flag based on the determined context model.

According to an aspect of an exemplary embodiment, an entropy decoding apparatus of a video is provided, the apparatus includes a parser configured to obtain a transformation unit significant coefficient flag from a bitstream which indicates whether a non-zero transformation coefficient exists in a transformation unit which is included in a coding unit and used to inversely transform the coding unit; a context modeler configured to determine a context model for arithmetically decoding the transformation unit significant coefficient flag based on a transformation depth of the transformation unit in response to a number of times the coding unit is split when determining the transformation unit being the transformation depth of the transformation unit; and an arithmetic decoder configured to arithmetically decode the transformation unit significant coefficient flag based on the determined context model.

According to an aspect of an exemplary embodiment, an entropy encoding method of a video is provided, the method includes: obtaining data of a coding unit transformed based on a transformation unit; determining a context model for arithmetically encoding a transformation unit significant coefficient flag which indicates whether a non-zero transformation coefficient exists in the transformation unit based on a transformation depth of the transformation unit in response to a number of times the coding is split when determining the transformation unit being the transformation depth of the transformation unit; and arithmetically encoding the transformation unit significant coefficient flag based on the determined context model.

According to an aspect of an exemplary embodiment, an entropy encoding apparatus of a video is provided, the apparatus includes: a context modeler configured to obtain data of a coding unit which is transformed based on a transformation unit and, determine a context model for arithmetically encoding a transformation unit significant coefficient flag indicating whether a non-zero transformation coefficient exists in the transformation unit based on a transformation depth of the transformation unit in response to a number of times the coding unit is split when determining the transformation unit being the transformation depth of the transformation unit; and an arithmetic encoder configured to arithmetically encode the transformation unit significant coefficient flag based on the determined context model.

According to an aspect of an exemplary embodiment, a video decoding apparatus is provided, the video decoding apparatus includes a parser configured to receive a bitstream of an encoded video and parse at least one syntax element; an entropy decoder configured to arithmetically decode the at least one parsed syntax element by performing entropy decoding of the at least one parsed syntax element and extract information about at least one of a coded depth and an encoding mode according to each largest coding unit from the at least one parsed syntax element; and a hierarchical decoded configured to reconstruct a picture by decoding image data in each largest coding unit based on the at least one of the coded depth and the encoded mode.

BRIEF DESCRIPTION OF THE DRAWINGS

FIG. 21 illustrates a significance map corresponding to the transformation unit of FIG. 20.

FIG. 22 illustrates coeff_abs_level_greater1_flag corresponding to the 4×4 transformation unit of FIG. 20.

FIG. 23 illustrates coeff_abs_level_greater2_flag corresponding to the 4×4 transformation unit of FIG. 20.

FIG. 24 illustrates coeff_abs_level_remaining corresponding to the 4×4 transformation unit of FIG. 20.

DETAILED DESCRIPTION OF THE EXEMPLARY EMBODIMENTS

Hereinafter, a method and apparatus for updating a parameter used in entropy encoding and decoding size information of a transformation unit according to an exemplary embodiment of will be described with reference to FIGS. 1 through 13. In addition, a method of entropy encoding and decoding a syntax element obtained by using the method of entropy encoding and decoding of a video described with reference to FIGS. 1 through 13 will be described in detail with reference to FIGS. 14 through 27. Expressions such as "at least one of," when preceding a list of elements, modify the entire list of elements and do not modify the individual elements of the list.

Figure 1:
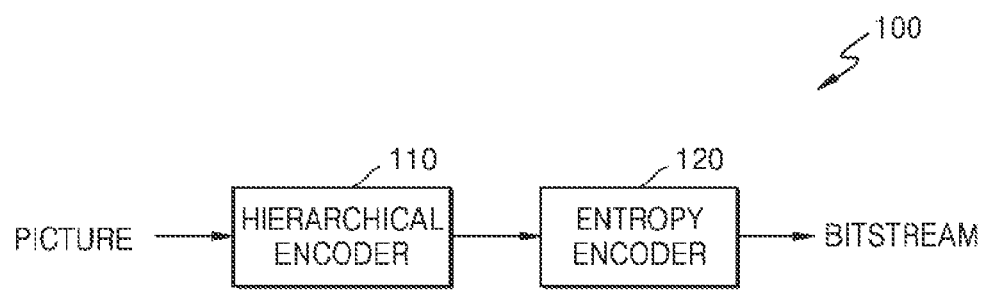
FIG. 1 is a block diagram of a video encoding apparatus according to an exemplary embodiment.

FIG. 1 is a block diagram of a video encoding apparatus 100 according to an exemplary embodiment.

The video encoding apparatus 100 includes a hierarchical encoder 110 and an entropy encoder 120.

The hierarchical encoder 110 may split a current picture to be encoded, in units of predetermined data units to perform encoding on each of the data units. In detail, the hierarchical encoder 110 may split a current picture based on a largest coding unit, which is a coding unit of a maximum size. The largest coding unit according to an exemplary embodiment may be a data unit having a size of 32×32, 64×64, 128×128, 256×256, etc., wherein a shape of the data unit is a square which has width and length in squares of 2 and is greater than 8.

A coding unit according to an exemplary embodiment may be characterized by a maximum size and a depth. The depth denotes the number of times the coding unit is spatially split from the largest coding unit, and as the depth deepens, deeper encoding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, image data of the current picture is split into the largest coding units according to a maximum size of the coding unit, and each of the largest coding units may include deeper coding units that are split according to depths. Since the largest coding unit according to an exemplary embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The hierarchical encoder 110 encodes at least one split region obtained by splitting a region of the largest coding unit according to depths, and determines a depth to output finally encoded image data according to the at least one split region. In other words, the hierarchical encoder 110 determines a coded depth by encoding the image data in the deeper coding units according to depths, according to the largest coding unit of the current picture, and selecting a depth having the least encoding error. The determined coded depth and the encoded image data according to maximum encoding units are output to the entropy encoder 120.

The image data in the largest coding unit is encoded based on the deeper coding units corresponding to at least one depth equal to or less than the maximum depth, and results of encoding the image data are compared based on each of the deeper coding units. A depth having the least encoding error may be selected after comparing encoding errors of the deeper coding units. At least one coded depth may be selected for each largest coding unit.

The size of the largest coding unit is split as a coding unit is hierarchically split according to depths and as the number of coding units increases. Also, even if coding units correspond to a same depth in one largest coding unit, it is determined whether to split each of the coding units corresponding to the same depth to a lower depth by measuring an encoding error of the image data of each coding unit, separately. Accordingly, even when image data is included in one largest coding unit, the image data is split into regions according to the depths, and the encoding errors may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, the hierarchical encoder 110 may determine coding units having a tree structure included in the largest coding unit. The 'coding units having a tree structure' according to an exemplary embodiment include coding units corresponding to a depth determined to be the coded depth, from among all deeper coding units included in the largest coding unit. A coding unit having a coded depth may be hierarchically determined according to depths in the same region of the largest coding unit, and may be independently determined in different regions. Similarly, a coded depth in a current region may be independently determined from a coded depth in another region.

A maximum depth according to an exemplary embodiment is an index related to the number of times a largest coding unit is split into smallest coding units. A first maximum depth according to an exemplary embodiment may denote the total number of times the largest coding unit is split into the smallest coding units. A second maximum depth according to an exemplary embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. If the smallest coding unit is a coding unit in which the largest coding unit is split four times, five depth levels of depths 0, 1, 2, 3, and 4 exist. Thus, the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding including the prediction encoding and the transformation is performed on all of the deeper coding units generated as the depth deepens. For descriptive convenience, the prediction encoding and the transformation will now be described based on a coding unit of a current depth, in a largest coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having the least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size equal to or less than the size of the coding unit. For example, the data unit for the transformation may include a data unit for an intra mode and a data unit for an inter mode.

A data unit used as a base of the transformation is referred to as a 'transformation unit'. Similar to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times the height and width of the coding unit are split to reach the transformation unit may also be set in the transformation unit. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the hierarchical encoder 110 not only determines a coded depth having the least encoding error, but also determines a partition type in a prediction unit, a prediction mode according to prediction units, and a size of a transformation unit for transformation.

Coding units according to a tree structure in a largest coding unit and a method of determining a partition, according to exemplary embodiments, will be described in detail below with reference to FIGS. 3 through 12.

The hierarchical encoder 110 may measure an encoding error of deeper coding units according to depths by using Rate-Distortion Optimization based on Lagrangian multipliers.

The entropy encoder 120 outputs the image data of the largest coding unit, which is encoded based on the at least one coded depth determined by the hierarchical encoder 110, and information about the encoding mode according to the coded depth, in bitstreams. The encoded image data may be a coding result of residual data of an image. The information about the encoding mode according to the coded depth may include information about the coded depth, information about the partition type in the prediction unit, prediction mode information, and size information of the transformation unit. In particular, as will be described below, the entropy encoder 120 may entropy encode a transformation unit significant coefficient flag (coded_block_flag) cbf indicating whether a non-0 transformation coefficient is included in a transformation unit, using a context model determined based on a transformation depth of the transformation unit. An operation of entropy encoding syntax elements related to a transformation unit in the entropy encoding unit 120 will be described below.

The information about the coded depth may be defined using split information according to depths, which indicates whether encoding is performed on coding units of a lower depth instead of a current depth. If the current depth of the current coding unit is the coded depth, image data in the current coding unit is encoded and output. Thus, the split information may be defined not to split the current coding unit to a lower depth. Alternatively, if the current depth of the current coding unit is not the coded depth, the encoding is performed on the coding unit of the lower depth. Thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth. Thus, the encoding may be recursively performed for the coding units having the same depth.

Since the coding units having a tree structure are determined for one largest coding unit, and information about at least one encoding mode is determined for a coding unit of a coded depth, information about at least one encoding mode may be determined for one largest coding unit. Also, a coded depth of the image data of the largest coding unit may be different according to locations since the image data is hierarchically split according to depths. Thus, information about the coded depth and the encoding mode may be set for the image data.

Accordingly, the entropy encoder 120 may assign encoding information about a corresponding coded depth and an encoding mode to at least one of the coding unit, the prediction unit, and a minimum unit included in the largest coding unit.

The minimum unit according to an exemplary embodiment is a square-shaped data unit obtained by splitting the smallest coding unit constituting the lowermost depth by 4. Alternatively, the minimum unit may be a maximum square-shaped data unit that may be included in all of the coding units, prediction units, partition units, and transformation units included in the largest coding unit.

For example, the encoding information output through the entropy encoder 120 may be classified into encoding information according to coding units and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or group of pictures (GOPs), and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of four coding units of the lower depth.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit using any one of various prediction modes and transformations, an optimum encoding mode may be determined considering characteristics of the coding unit of various image sizes.

Thus, if an image having a high resolution or a large data amount is encoded in a related art macroblock, a number of macroblocks per picture excessively increases. Accordingly, a number of pieces of compressed information generated for each macroblock increases. Thus, it is difficult to transmit the compressed information, and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
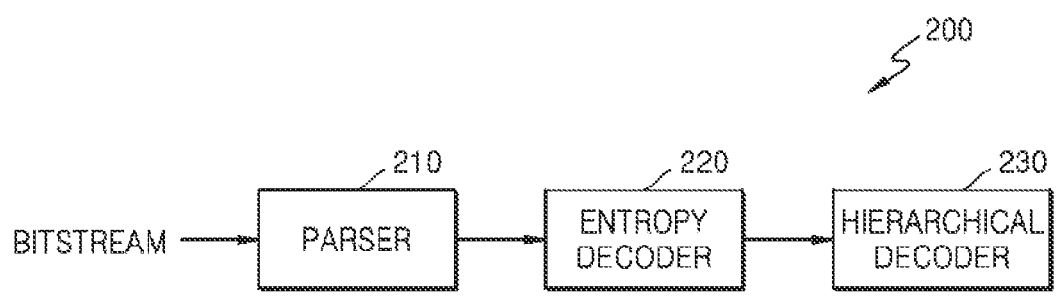
FIG. 2 is a block diagram of a video decoding apparatus according to an exemplary embodiment.

FIG. 2 is a block diagram of a video decoding apparatus 200 according to an exemplary embodiment.

The video decoding apparatus 200 includes a parser 210, an entropy decoder 220, and a hierarchical decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The parser 210 receives a bitstream of an encoded video to parse a syntax element. The entropy decoder 220 arithmetically decodes syntax elements indicating encoded image data based on coding units having a structure by performing entropy decoding of parsed syntax elements, and outputs the arithmetically decoded syntax elements to the hierarchical decoder 230. In other words, the entropy decoder 220 performs entropy decoding of syntax elements that are received in the form of bit strings of 0 and 1, thereby reconstructing the syntax elements.

Also, the entropy decoder 220 extracts information about a coded depth, an encoding mode, color component information, prediction mode information, etc., for the coding units having a tree structure according to each largest coding unit, from the parsed bitstream. The extracted information about the coded depth and the encoding mode is output to the hierarchical decoder 230. The image data in a bitstream is split into the largest coding unit so that the hierarchical decoder 230 may decode the image data for each largest coding unit.

The information about the coded depth and the encoding mode according to the largest coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each largest coding unit extracted by the entropy decoder 220 is information about a coded depth and an encoding mode determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the entropy decoder 220 may extract the information about the coded depth and the encoding mode according to the predetermined data units. When information about a coded depth and encoding mode of a corresponding largest coding unit is assigned to each of predetermined data units, the predetermined data units to which the same information about the coded depth and the encoding mode is assigned may be inferred to be the data units included in the same largest coding unit.

Also, as will be described below, the entropy decoder 220 may entropy decode a transformation unit significant coefficient flag cbf using a context model determined based on a transformation depth of a transformation unit. An operation of entropy decoding syntax elements related to a transformation unit in the entropy decoder 220 will be described below.

The hierarchical decoder 230 reconstructs the current picture by decoding the image data in each largest coding unit based on the information about the coded depth and the encoding mode according to the largest coding units. In other words, the hierarchical decoder 230 may decode the encoded image data based on the extracted information about the partition type, the prediction mode, and the transformation unit for each coding unit from among the coding units having the tree structure included in each largest coding unit. A decoding operation may include prediction including intra prediction and motion compensation, and inverse transformation.

The hierarchical decoder 230 may perform intra prediction or motion compensation according to a partition and a prediction mode of each coding unit, based on the information about the partition type and the prediction mode of the prediction unit of the coding unit according to coded depths.

Also, the hierarchical decoder 230 may perform inverse transformation according to each transformation unit in the coding unit, based on the information about the size of the transformation unit of the coding unit according to coded depths, so as to perform the inverse transformation according to largest coding units.

The hierarchical decoder 230 may determine at least one coded depth of a current largest coding unit using split information according to depths. If the split information indicates that image data is no longer split in the current depth, the current depth is a coded depth. Accordingly, the hierarchical decoder 230 may decode the coding unit of the current depth with respect to the image data of the current largest coding unit using the information about the partition type of the prediction unit, the prediction mode, and the size of the transformation unit.

In other words, data units containing the encoding information including the same split information may be collected by observing the set encoding information assigned for the predetermined data unit from among the coding unit, the prediction unit, and the minimum unit, and the collected data units may be considered to be one data unit to be decoded by the hierarchical decoder 230 in the same encoding mode.

The video decoding apparatus 200 may obtain information about at least one coding unit that generates the minimum encoding error when encoding is recursively performed for each largest coding unit, and may use the information to decode the current picture. In other words, encoded image data of the coding units having the tree structure determined to be the optimum coding units in each largest coding unit may be decoded.

Accordingly, even if image data has a high resolution and a large amount of data, the image data may be efficiently decoded and reconstructed using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
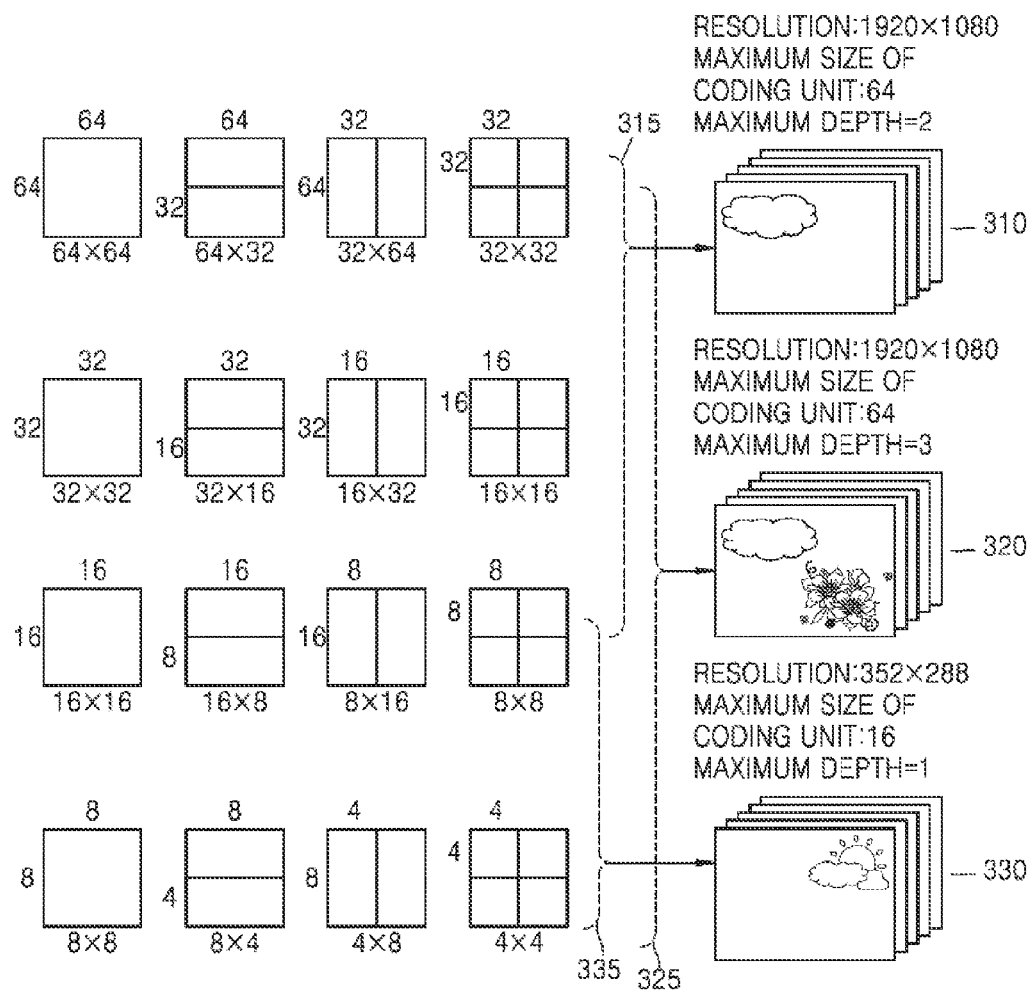
FIG. 3 is a diagram for describing a concept of coding units according to an exemplary embodiment.

FIG. 3 is a diagram for describing a concept of coding units according to an exemplary embodiment.

As shown in FIG. 3, a size of a coding unit may be expressed in width×height, and may be 64×64, 32×32, 16×16, and 8×8. A coding unit of 64×64 may be split into partitions of 64×64, 64×32, 32×64, or 32×32. A coding unit of 32×32 may be split into partitions of 32×32, 32×16, 16×32, or 16×16. A coding unit of 16×16 may be split into partitions of 16×16, 16×8, 8×16, or 8×8. A coding unit of 8×8 may be split into partitions of 8×8, 8×4, 4×8, or 4×4.

Regarding video data 310, a resolution of 1920×1080, a maximum size of a coding unit of 64, and a maximum depth of 2 are set. Regarding video data 320, a resolution of 1920×1080, a maximum size of a coding unit of 64, and a maximum depth of 3 are set. Regarding video data 330, a resolution of 352×288, a maximum size of a coding unit of 16, and a maximum depth of 1 are set. The maximum depth shown in FIG. 3 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Meanwhile, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 4:
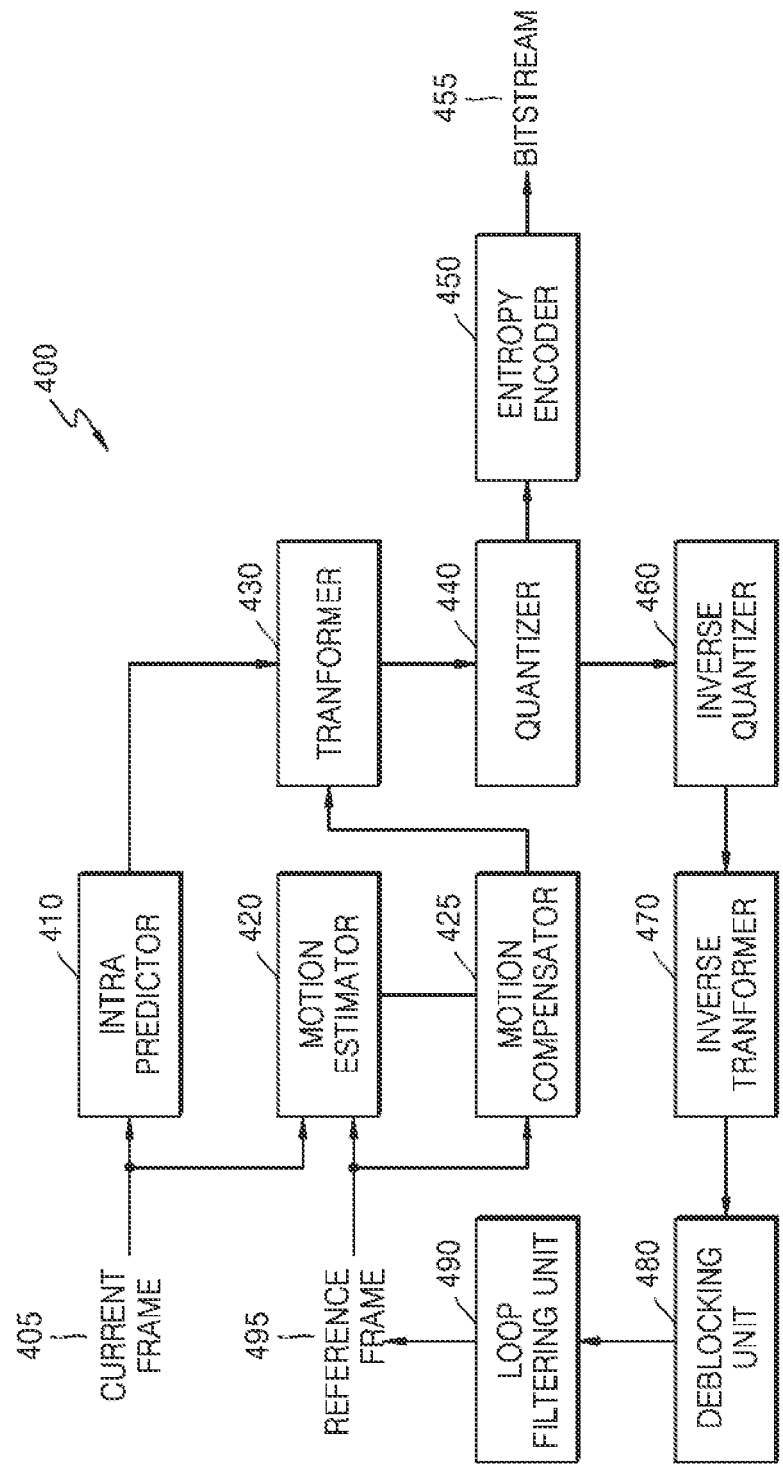
FIG. 4 is a block diagram of a video encoder based on coding units having a hierarchical structure, according to an exemplary embodiment.

FIG. 4 is a block diagram of a video encoder 400 based on coding units having a hierarchical structure, according to an exemplary embodiment.

An intra predictor 410 performs intra prediction on coding units in an intra mode, with respect to a current frame 405, and a motion estimator 420 and a motion compensator 425 respectively perform inter estimation and motion compensation on coding units in an inter mode using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking filter 480 and a loop filter 490. The quantized transformation coefficient may be output as a bitstream 455 through an entropy encoder 450.

The entropy encoding unit 450 arithmetically encodes syntax elements related to a transformation unit, such as a transformation unit significant coefficient flag (cbf) indicating whether a non-0 transformation coefficient is included in a transformation unit, a significance map indicating a location of a non-0 transformation coefficient, a first critical value flag (coeff_abs_level_greater1_flag) indicating whether a transformation coefficient has a value greater than 1, a second critical value flag (coeff_abs_level_greather2_flag) indicating whether a transformation coefficient has a value greater than 2, and a size information of a transformation coefficient (coeff_abs_level_remaining) corresponding to a difference between a base level (baseLevel) that is determined based on the first critical value flag and the second critical value flag and a real transformation coefficient (abscoeff).

In order for the video encoder 400 to be applied in the video encoding apparatus 100, all elements of the video encoder 400, i.e., the intra predictor 410, the motion estimator 420, the motion compensator 425, the transformer 430, the quantizer 440, the entropy encoder 450, the inverse quantizer 460, the inverse transformer 470, the deblocking filter 480, and the loop filter 490, have to perform operations based on each coding unit from among coding units having a tree structure while considering the maximum depth of each largest coding unit.

In particular, the intra predictor 410, the motion estimator 420, and the motion compensator 425 determine partitions and a prediction mode of each coding unit from among the coding units having a tree structure while considering the maximum size and the maximum depth of a current largest coding unit, and the transformer 430 determines the size of the transformation unit in each coding unit from among the coding units having a tree structure.

Figure 5:
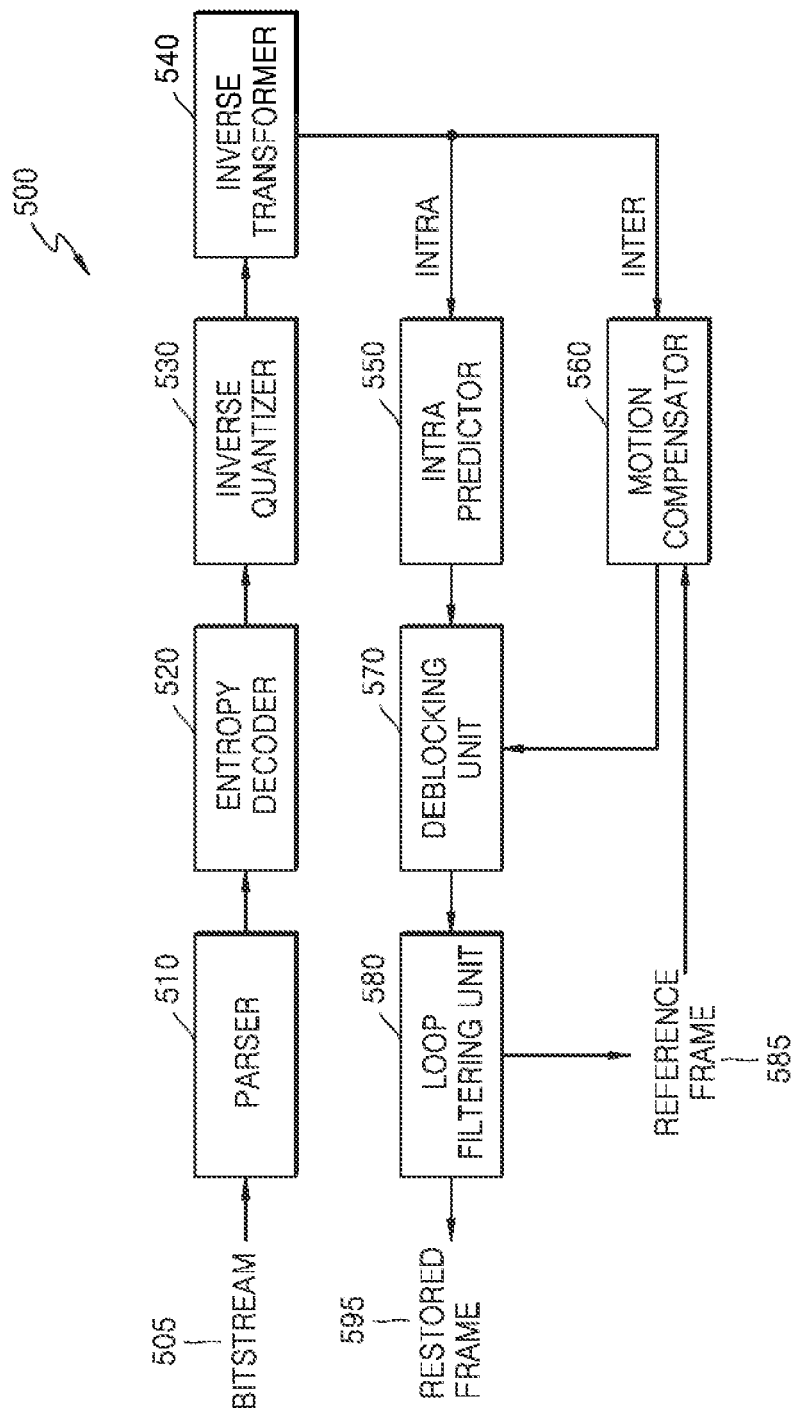
FIG. 5 is a block diagram of a video decoder based on coding units having a hierarchical structure, according to an exemplary embodiment.

FIG. 5 is a block diagram of a video decoder 500 based on coding units, according to an exemplary embodiment.

A parser 510 parses encoded image data to be decoded and information about encoding required for decoding, from a bitstream 505. The encoded image data passes through the decoder 520 and the inverse quantizer 530 to be output as inversely quantized data. The entropy decoder 520 obtains elements related to a transformation unit from a bitstream, that is, a transformation unit significant coefficient flag (cbf) indicating whether a non-0 transformation coefficient is included in a transformation unit, a significance map indicating a location of a non-0 transformation coefficient, a first critical value flag (coeff_abs_level_greater1_flag) indicating whether a transformation coefficient has a value greater than 1, a second critical value flag (coeff_abs_level_greather2_flag) indicating whether a transformation coefficient has a value greater than 2, and a size information of a transformation coefficient (coeff_abs_level_remaining) corresponding to a difference between a base level (baseLevel) that is determined based on the first critical value flag and the second critical value flag and a real transformation coefficient (abscoeff), and arithmetically decodes the obtained syntax elements so as to reconstruct the syntax elements.

An inverse transformer 540 reconstructs the inversely quantized data to image data in a spatial domain. An intra predictor 550 performs intra prediction on coding units in an intra mode with respect to the image data in the spatial domain, and a motion compensator 560 performs motion compensation on coding units in an inter mode using a reference frame 585.

The image data in the spatial domain, which has passed through the intra predictor 550 and the motion compensator 560, may be output as a reconstructed frame 595 after being post-processed through a deblocking filter 570 and a loop filter 580. Also, the image data, which is post-processed through the deblocking filter 570 and the loop filter 580, may be output as the reference frame 585.

In order for the video decoder 500 to be applied in the video decoding apparatus 200, all elements of the video decoder 500, i.e., the parser 510, the entropy decoder 520, the inverse quantizer 530, the inverse transformer 540, the intra predictor 550, the motion compensator 560, the deblocking filter 570, and the loop filter 580, perform operations based on coding units having a tree structure for each largest coding unit.

The intra predictor 550 and the motion compensator 560 determine a partition and a prediction mode for each coding unit having a tree structure, and the inverse transformer 540 has to determine a size of a transformation unit for each coding unit.

Figure 6:
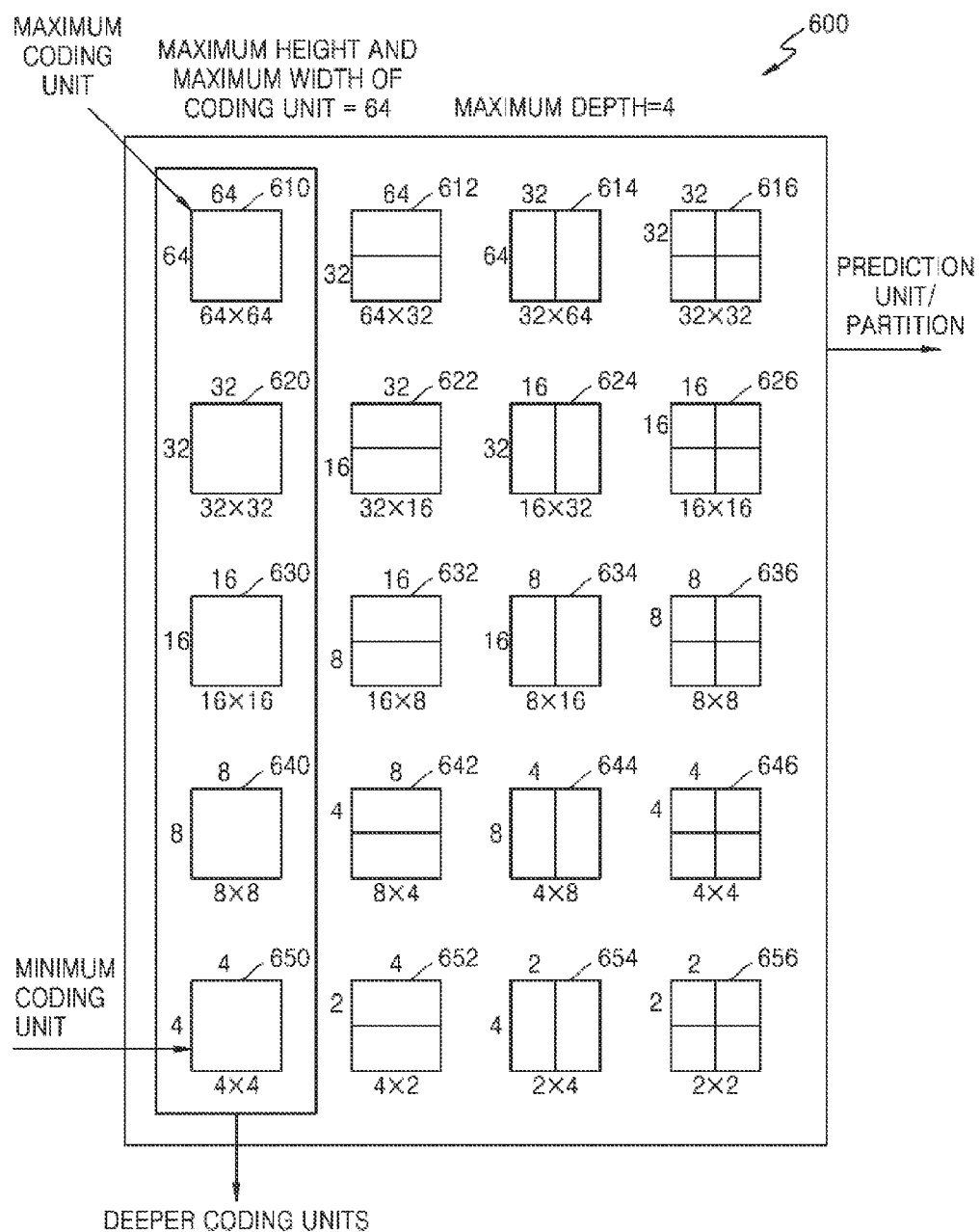
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a smallest coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similar, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similar, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similar, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the smallest coding unit and a coding unit of the lowermost depth. A prediction unit of the coding unit 650 is only assigned to a partition having a size of 4×4.

In order to determine the at least one coded depth of the coding units constituting the largest coding unit 610, the hierarchical encoder 110 of the video encoding apparatus 100 performs encoding for coding units corresponding to each depth included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the largest coding unit 610 may be selected as the coded depth and a partition type of the largest coding unit 610.

Figure 7:
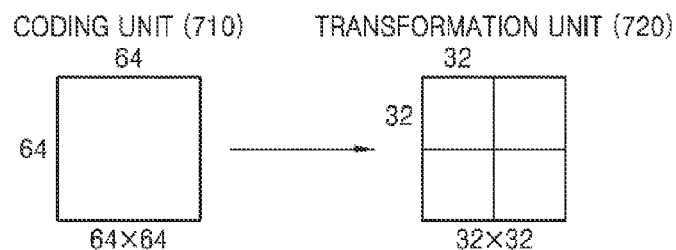
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or the video decoding apparatus 200 encodes or decodes an image of each largest coding unit according to coding units having sizes equal to or less than the size of the largest coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
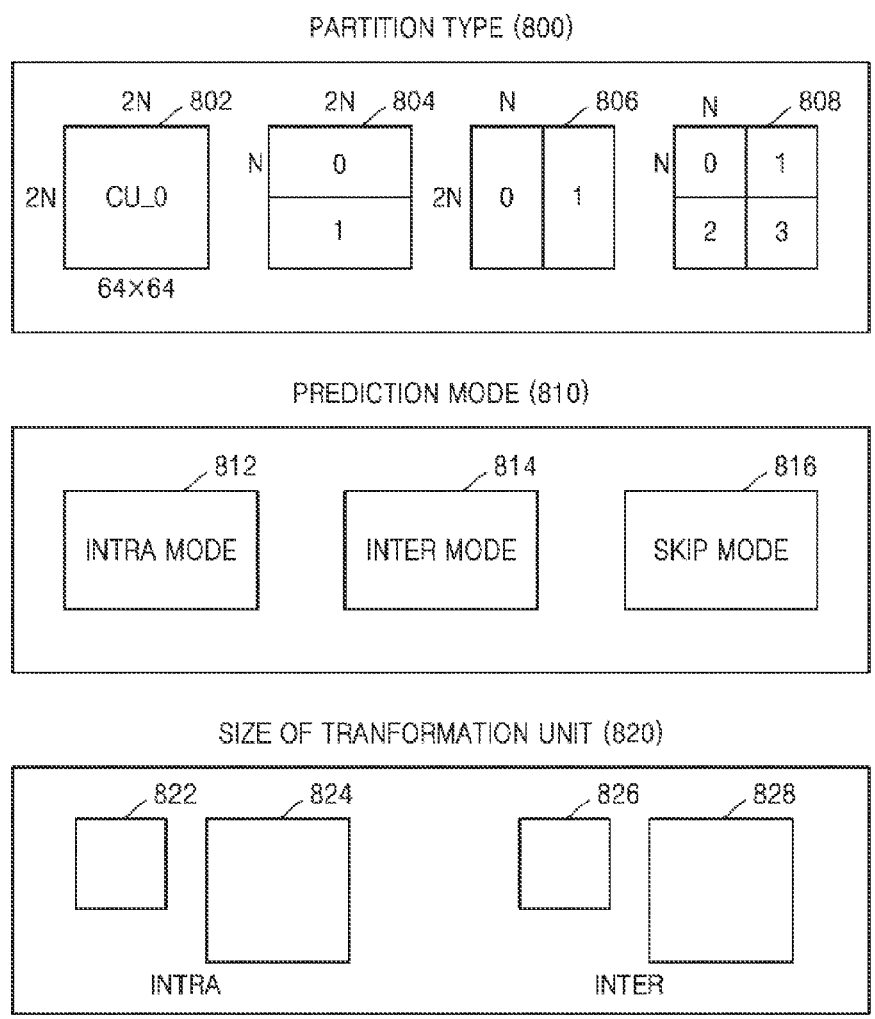
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment.

An output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 802 having a size of 2N×2N, the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding data extracting unit 210 of the video decoding apparatus 200 may extract and use the information 800 information about coding units, the information 810 about a prediction mode, and the information 820 about a size of a transformation unit, for decoding, according to each deeper coding unit.

Figure 9:
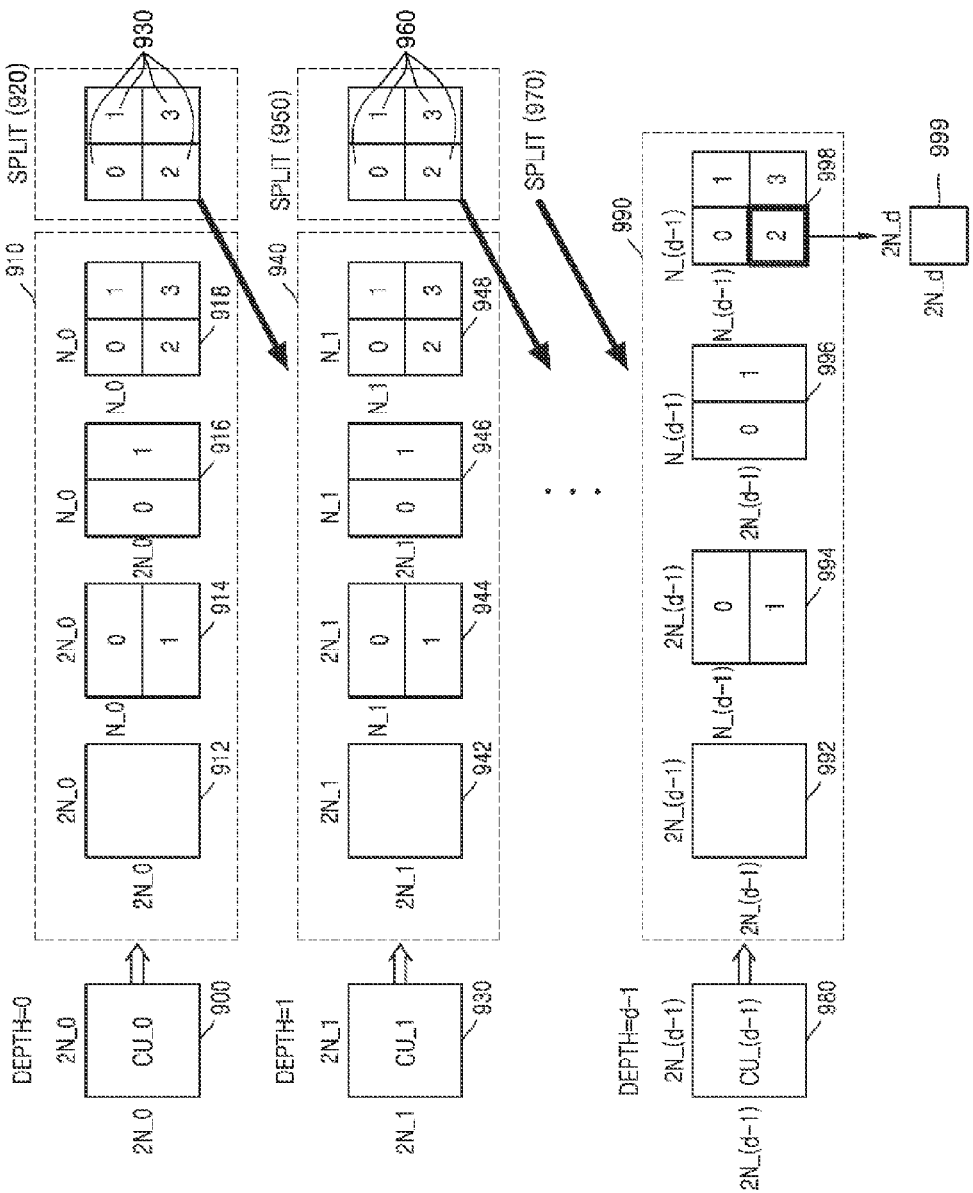
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto. Therefore, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is the smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on partition type coding units having a depth of 2 and a size of N_0×N_0 to search for a minimum encoding error.

A prediction unit 940 for prediction encoding of the partition type coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting the current largest coding unit 900 is determined to be d−1 and a partition type of the current largest coding unit 900 may be determined to be N_(d−1)×N_(d−1). Also, since the maximum depth is d, split information for the smallest coding unit 952 is not set.

A data unit 999 may be a 'minimum unit' for the current largest coding unit. A minimum unit according to an exemplary embodiment may be a rectangular data unit obtained by splitting the smallest coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The entropy decoder 220 of the video decoding apparatus 200 may extract and use the information about the coded depth and the prediction unit of the coding unit 900 to decode the coding unit 912. The video decoding apparatus 200 may determine a depth, in which split information is 0, as a coded depth by using split information according to depths, and use information about an encoding mode of the corresponding depth for decoding.

Figure 10:
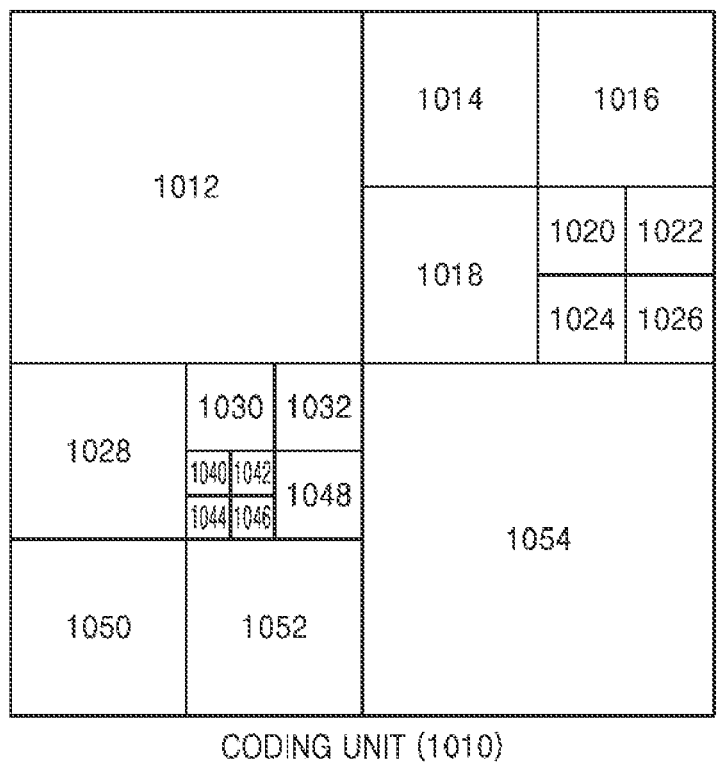
FIGS. 10 through 12 are diagrams for describing a relationship between coding units, prediction units, and frequency transformation units, according to an exemplary embodiment.
Figure 11:
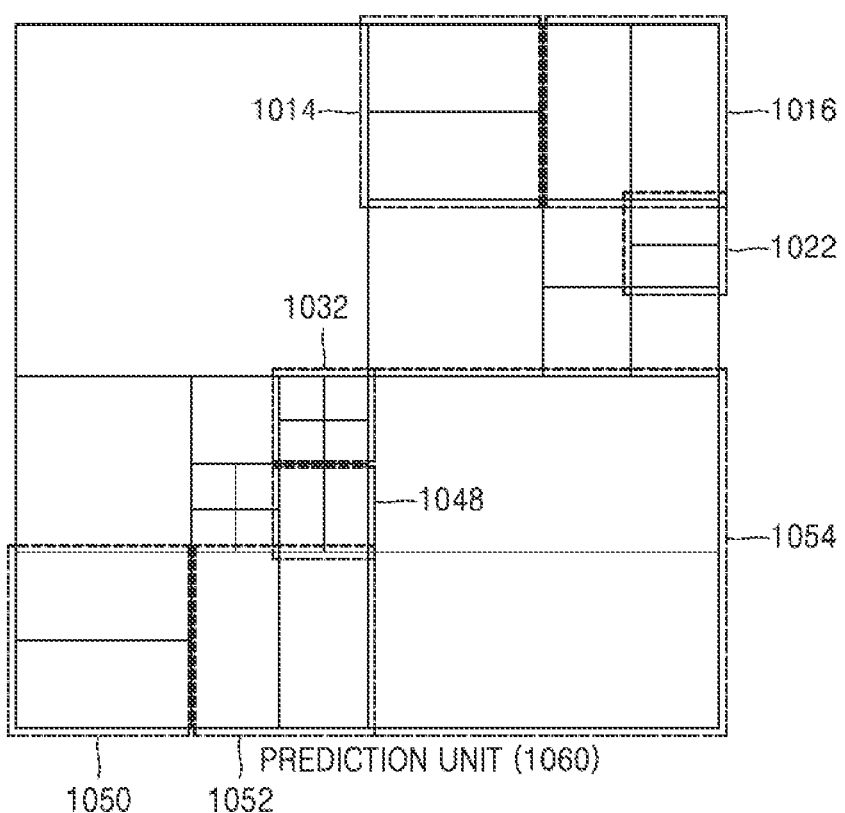
Figure 12:
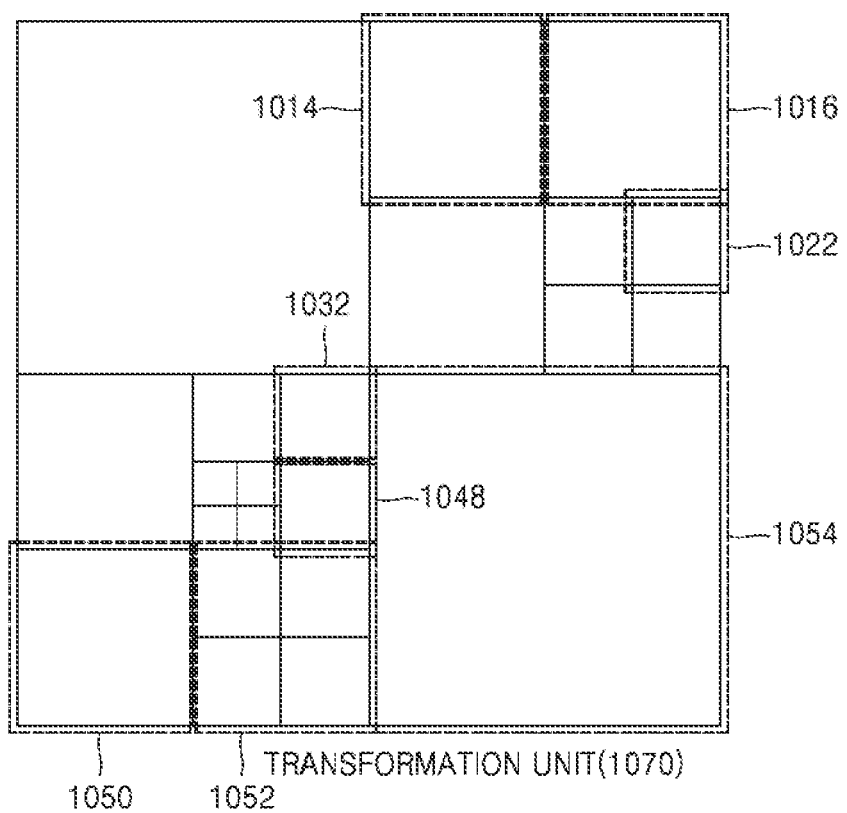

FIGS. 10 through 12 are diagrams for describing a relationship between coding units 1010, prediction units 1060, and transformation units 1070 according to an exemplary embodiment.

The coding units 1010 are coding units having a tree structure, corresponding to coded depths determined by the video encoding apparatus 100, in a largest coding unit. The prediction units 1060 are partitions of prediction units of each of the coding units 1010, and the transformation units 1070 are transformation units of each of the coding units 1010.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are equal to or smaller than each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1070 are different from those in the prediction units 1060 in terms of sizes and shapes. In other words, the video encoding apparatus 100 and the video decoding apparatus 200 may perform intra prediction, motion estimation, motion compensation, transformation, and inverse transformation individually on a data unit in the same coding unit.

Accordingly, encoding is recursively performed on each of coding units having a hierarchical structure in each region of a largest coding unit to determine an optimum coding unit. Thus, coding units having a recursive tree structure may be obtained. Encoding information may include split information about a coding unit, information about a partition type, information about a prediction mode, and information about a size of a transformation unit.

Table 1 shows the encoding information that may be set by the video encoding apparatus 100 and the video decoding apparatus 200.

asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:n and n:1 (where n is an integer greater than 1), and the asymmetrical partition types having the sizes of nL×2N and nR×2N may be respectively obtained by splitting the width of the prediction unit in 1:n and n:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a

TABLE 1

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units Having Lower Depth of d + 1 |

The entropy encoder 120 of the video encoding apparatus 100 may output the encoding information about the coding units having a tree structure, and the entropy decoder 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth. Thus, information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit. Thus, a distribution of coded depths in a largest coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
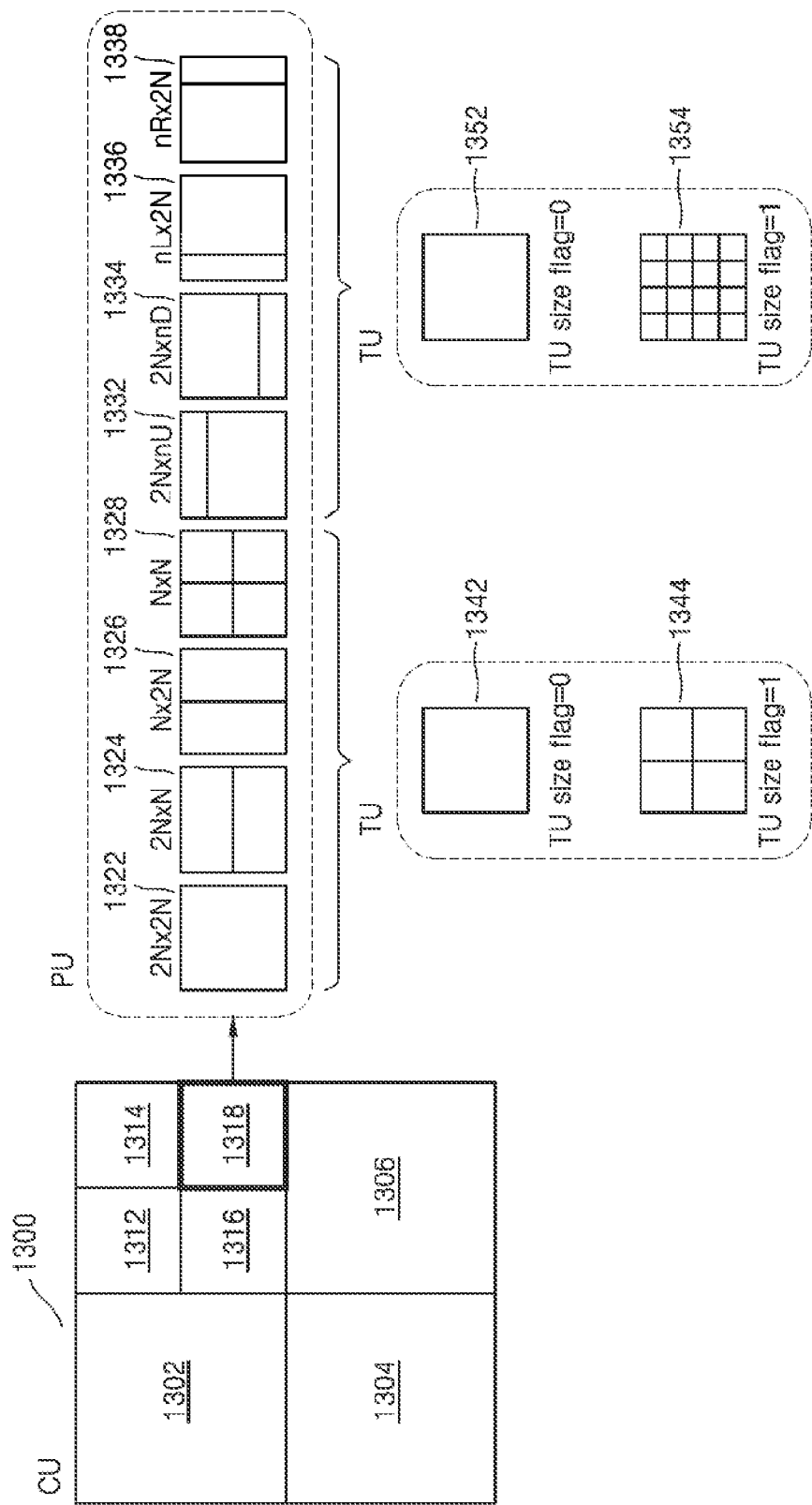
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit according to the encoding mode information of Table 1.

A largest coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

The TU size flag is a type of transformation index. A size of a transformation unit corresponding to a transformation index may be modified according to a prediction unit type or a partition type of a coding unit.

When the partition type is set to be symmetrical, i.e. the partition type 1322, 1324, 1326, or 1328, the transformation unit 1342 having a size of 2N×2N is set if a TU size flag of a transformation unit is 0, and the transformation unit 1344 having a size of N×N is set if a TU size flag is 1.

When the partition type is set to be asymmetrical, i.e., the partition type 1332 (2N×nU), 1334 (2N×nD), 1336 (nL×2N), or 1338 (nR×2N), the transformation unit 1352 having a size of 2N×2N is set if a TU size flag is 0, and the transformation unit 1354 having a size of N/2×N/2 is set if a TU size flag is 1.

Referring to FIG. 9, the TU size flag described above is a flag having a value of 0 or 1, but the TU size flag is not limited to 1 bit, and a transformation unit may be hierarchically split while the TU size flag increases from 0. The transformation unit split information (TU size flag) may be used as an example of a transformation index.

In this case, when a TU size flag according to an embodiment is used with a maximum size and a minimum size of a transformation unit, the size of the actually used transformation unit may be expressed. The video encoding apparatus 100 may encode largest transformation unit size information, smallest transformation unit size information, and largest transformation unit split information. The encoded largest transformation unit size information, smallest transformation unit size information, and largest transformation unit split information may be inserted into a sequence parameter set (SPS). The video decoding apparatus 200 may use the largest transformation unit size information, the smallest transformation unit size information, and the largest transformation unit split information for video decoding.

For example, (a) if a size of a current coding unit is 64×64 and a largest transformation unit is 32×32, (a-1) a size of a transformation unit is 32×32 if a TU size flag is 0; (a-2) a size of a transformation unit is 16×16 if a TU size flag is 1; and (a-3) a size of a transformation unit is 8×8 if a TU size flag is 2.

Alternatively, (b) if a size of a current coding unit is 32×32 and a smallest transformation unit is 32×32, (b-1) a size of a transformation unit is 32×32 if a TU size flag is 0, and since the size of a transformation unit cannot be smaller than 32×32, no more TU size flags may be set.

Alternatively, (c) if a size of a current encoding unit is 64×64 and a maximum TU size flag is 1, a TU size flag may be 0 or 1 and no other TU size flags may be set.

Accordingly, when defining a maximum TU size flag as 'MaxTransformSizeIndex', a minimum TU size flag as 'MinTransformSize', and a transformation unit in the case when a TU size flag is 0, that is, a root transformation unit RootTu as 'RootTuSize', a size of a smallest transformation unit 'CurrMinTuSize', which is available in a current coding unit, may be defined by Equation (1) below.

$$\text{CurrMinTuSize} = \max(\text{MinTransformSize}, \text{RootTuSize}/(2^{\wedge}\text{MaxTransformSizeIndex})) \quad (1)$$

In comparison with the size of the smallest transformation unit 'CurrMinTuSize' that is available in the current coding unit, the root transformation unit size 'RootTuSize', which is a size of a transformation unit when if a TU size flag is 0, may indicate a largest transformation unit which may be selected in regard to a system. That is, according to Equation (1), 'RootTuSize/(2^MaxTransformSizeIndex)' is a size of a transformation unit that is obtained by splitting 'RootTuSize', which is a size of a transformation unit when transformation unit split information is 0, by the number of splitting times corresponding to the largest transformation unit split information, and 'MinTransformSize' is a size of a smallest transformation unit, and thus a smaller value of these may be 'CurrMinTuSize' which is the size of the smallest transformation unit that is available in the current coding unit.

The size of the root transformation unit 'RootTuSize' according to an exemplary embodiment may vary according to a prediction mode.

For example, if a current prediction mode is an inter mode, RootTuSize may be determined according to Equation (2) below.

$$\text{RootTuSize} = \min(\text{MaxTransformSize}, \text{PUSize}) \quad (2)$$

In Equation (2), 'MaxTransformSize' refers to a largest transformation unit size, and 'PUSize' refers to a current prediction unit size.

In other words, if a current prediction mode is an inter mode, the size of the root transformation unit size 'RootTuSize', which is a transformation unit if a TU size flag is 0, may be set to a smaller value from among the largest transformation unit size and the current prediction unit size.

If a prediction mode of a current partition unit is an intra mode, 'RootTuSize' may be determined according to Equation (3) below.

$$\text{RootTuSize} = \min(\text{MaxTransformSize}, \text{PartitionSize}) \quad (3)$$

In Equation (3), 'PartitionSize' refers to a size of the current partition unit.

In other words, if a current prediction mode is an intra mode, the root transformation unit size 'RootTuSize' may be set to a smaller value from among the largest transformation unit size and the current partition unit size.

However, it should be noted that the size of the root transformation unit size 'RootTuSize', which is the current largest transformation unit size according to an exemplary embodiment and varies according to a prediction mode of a partition unit, is an example, and factors for determining the current largest transformation unit size are not limited thereto.

An entropy encoding operation of a syntax element, which is performed by the entropy encoder 120 of the video encoding apparatus 100 of FIG. 1, and an entropy decoding operation of a syntax element, which is performed by the entropy decoder 220 of the video decoding apparatus 200 of FIG. 2, will now be described.

As described above, the video encoding apparatus 100 and the video decoding apparatus 200 perform encoding and decoding by splitting a largest coding unit into coding units that are equal to or smaller than the largest coding unit. A prediction unit and a transformation unit used in prediction and transformation may be determined based on costs which are independent from other data units. Since an optimum coding unit may be determined by recursively encoding each coding unit having a hierarchical structure included in the largest coding unit, data units having a tree structure may be configured. In other words, for each largest coding unit, a coding unit having a tree structure, and a prediction unit and a transformation unit each having a tree structure may be configured. For decoding, hierarchical information, which is information indicating structure information of data units having a hierarchical structure, and non-hierarchical information for decoding, besides the hierarchical information, need to be transmitted.

The information related to a hierarchical structure is information needed for determining a coding unit having a tree structure, a prediction unit having a tree structure, and a transformation unit having a tree structure, as described above with reference to FIGS. 10 through 12. Further, the information related to the hierarchical structure includes size information of a largest coding unit, coded depth, partition information of a prediction unit, a split flag indicating whether a coding unit is split, size information of a transformation unit, and a split transformation flag (split_transform_flag) indicating whether a transformation unit is split into smaller transformation units for a transformation operation. Examples of coding information other than hierarchical structure information include prediction mode information of intra/inter prediction applied to each prediction unit, motion vector information, prediction direction information, color component information applied to each data unit in the case when a plurality of color components are used, and transformation coefficient level information. Hereinafter, hierarchical information and extra-hierarchical information may be referred to as a syntax element which is to be entropy encoded or entropy decoded.

In particular, according to exemplary embodiments, a method of selecting a context model when a syntax element related to a transformation unit from among syntax elements is provided. An operation of entropy encoding and decoding syntax elements related to a transformation unit will now be described in detail.

Figure 14:
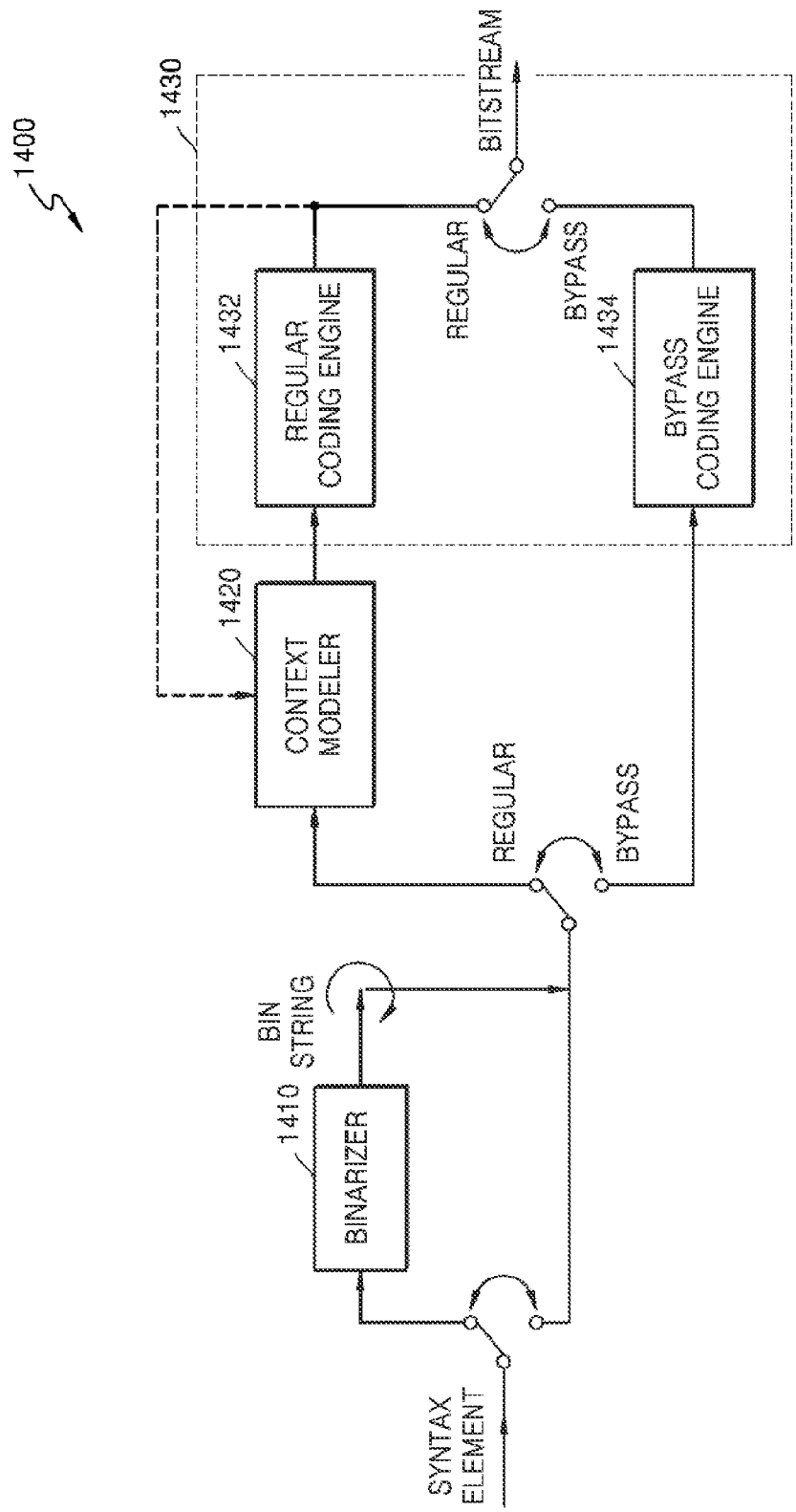
FIG. 14 is a block diagram of an entropy encoding apparatus according to an exemplary embodiment.

FIG. 14 is a block diagram of an entropy encoding apparatus 1400 according to an exemplary embodiment. The entropy encoding apparatus 1400 corresponds to the entropy encoder 120 of the video encoding apparatus 100 of FIG. 1.

Referring to FIG. 14, the entropy encoding apparatus 1400 includes a binarizer 1410, a context modeler 1420, and a binary arithmetic coder 1430. Also, the binary arithmetic coder 1430 includes a regular coding engine 1432 and a bypass coding engine 1434.

When syntax elements input to the entropy encoding apparatus 1400 are not binary values, the binarizer 1410 binarizes syntax elements so as to output a bin string consisting of binary values of 0 and 1. A bin denotes each bit of a stream consisting of 0 and 1, and is encoded by context adaptive binary arithmetic coding (CABAC). If a syntax element is data having a same probability between 0 and 1, the syntax element is output to the bypass coding engine 1434, which does not use a probability, to be encoded.

The binarizer 1410 may use various binarization methods according to the type of a syntax element. Examples of the binarization methods may include a unary method, a truncated unary method, a truncated rice code method, a Golomb code method, and a fixed length code method.

A transformation unit significant coefficient flag cbf indicating whether a non-zero transformation coefficient (hereinafter, referred to as a "significant coefficient") exists in a transformation unit is binarized by using the fixed code method. That is, if a non-zero transformation coefficient exists in the transformation unit, the transformation unit significant coefficient flag cbf is set to have a value to 1. Otherwise, if a non-zero transformation coefficient does not exist in the transformation unit, the transformation unit significant coefficient flag cbf is set to have a value of 0. If an image includes a plurality of color components, the transformation unit significant coefficient flag cbf may be set with respect to a transformation unit of each color component. For example, if an image includes luma (Y) and chroma (Cb, Cr) components, a transformation unit significant coefficient flag cbf_luma of a transformation unit of the luma component, and a transformation unit significant coefficient flag cbf_cb or cbf_cr of the transformation unit of the chroma component may be set.

The context modeler 1420 provides a context model for encoding a bit string corresponding to a syntax element, to the regular coding engine 1432. In more detail, the context modeler 1420 outputs a probability of a binary value for encoding each binary value of a bit string of a current syntax element, to the binary arithmetic coder 1430.

A context model is a probability model of a bin, and includes information about which of 0 and 1 corresponds to a most probable symbol (MPS) and a least probable symbol (LPS), and probability information of at least one of the MPS and the LPS.

The context modeler 1420 may select a context model for entropy encoding the transformation unit significant coefficient flag cbf, based on a transformation depth of the transformation unit. If the size of the transformation unit is equal to the size of a coding unit, that is, if the transformation depth of the transformation unit is 0, the context modeler 1420 may determine a preset first context model as a context model for entropy encoding the transformation unit significant coefficient flag cbf. Otherwise, if the size of the transformation unit is less than the size of the coding unit, that is, if the transformation depth of the transformation unit is not 0, the context modeler 1420 may determine a preset second context model as a context model for entropy encoding the transformation unit significant coefficient flag cbf. Here, the first and second context models are based on different probability distribution models. That is, the first and second context models are different context models.

As described above, when the transformation unit significant coefficient flag cbf is entropy encoded, the context modeler 1420 uses different context models in a case when the size of the transformation unit is equal to the size of the coding unit, and a case when the size of the transformation unit is not equal to the size of the coding unit. If an index indicating one of a plurality of preset context models for entropy encoding the transformation unit significant coefficient flag cbf is referred to as a context index ctxIdx, the context index ctxIdx may have a value obtained by summing a context increasement parameter ctxInc for determining a context model, and a preset context index offset ctxIdxOffset. That is, ctxIdx=ctxInc+ctxIdxOffset. The context modeler 1420 may distinguish a case when the transformation depth of the transformation unit is 0 from a case when the transformation depth of the transformation unit is not 0, may change the context increasement parameter ctxInc for determining a context model, based on the transformation depth of the transformation unit, and thus may change the context index ctxIdx for determining a context model for entropy encoding the transformation unit significant coefficient flag cbf.

In more detail, if the transformation depth is referred to as trafodepth, the context modeler 1420 may determine the context increasement parameter ctxInc based on the following algorithm.

--- ctxInc=(trafodepth==0)? 1: 0
This algorithm may be implemented by the following pseudo code.
{
If (trafodepth==0) ctxInc=1;
else ctxInc=0;
}

---

The transformation unit significant coefficient flag cbf may be separately set according to luma and chroma components. As described above, a context model for entropy encoding the transformation unit significant coefficient flag cbf_luma of the transformation unit of the luma component may be determined by using the context increasement parameter ctxInc that changes according to whether the transformation depth of the transformation unit is 0. A context model for entropy encoding the transformation unit significant coefficient flag cbf_cb or cbf_cr of the transformation unit of the chroma component may be determined by using a value of the transformation depth trafodepth as the context increasement parameter ctxInc.

The regular coding engine 1432 performs binary arithmetic encoding on a bitstream corresponding to a syntax element, based on the information about the MPS and the LPS and the probability information of at least one of the MPS and the LPS, which are included in the context model provided from the context modeler 1420.

Figure 15:
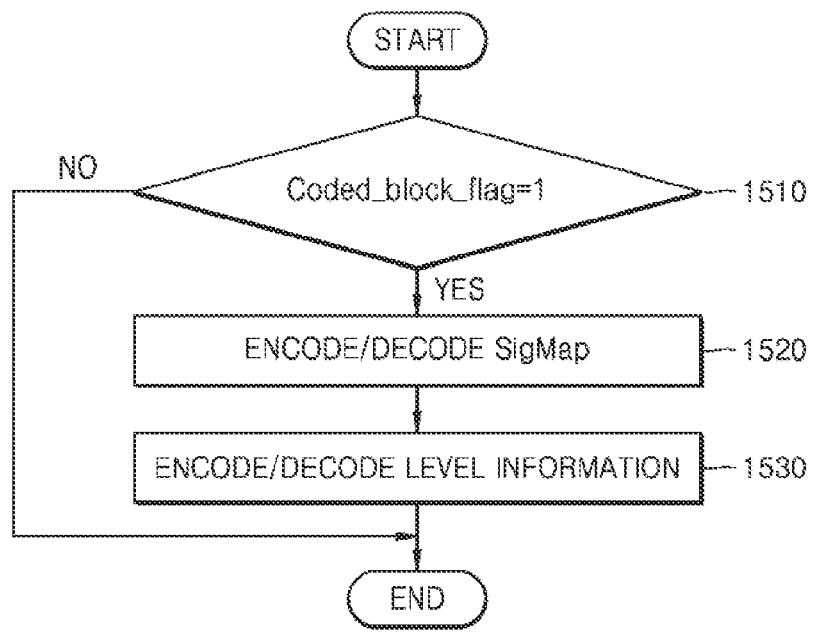
FIG. 15 is a flowchart of an operation of entropy encoding and decoding a syntax element related to a transformation unit, according to an exemplary embodiment.

FIG. 15 is a flowchart of an operation of entropy encoding and decoding a syntax element related to a transformation unit, according to an exemplary embodiment.

Referring to FIG. 15, in operation 1510, a transformation unit significant coefficient flag cbf indicating whether a non-zero transformation coefficient exists from among transformation coefficients included in a current transformation unit is initially entropy encoded and decoded. As described above, a context model for entropy encoding the transformation unit significant coefficient flag cbf may be determined based on a transformation depth of the transformation unit, and binary arithmetic encoding on the transformation unit significant coefficient flag cbf may be performed based on the determined context model.

If the transformation unit significant coefficient flag cbf is 0, since only transformation coefficients of 0 exist in the current transformation unit, only a value 0 is entropy encoded or decoded as the transformation unit significant coefficient flag cbf, and transformation coefficient level information is not entropy encoded or decoded.

In operation 1520, if a significant coefficient exists in the current transformation unit, a significance map SigMap indicating a location of a significant coefficient is entropy encoded or decoded.

A significance map SigMap may be formed of a significant bit and predetermined information indicating a location of a last significance coefficient. A significant bit indicates whether a transformation coefficient according to each scan index is a significant coefficient or 0, and may be expressed by significant_coeff_flag[i]. As will be described below, a significance map is set in units of subsets having a predetermined size which is obtained by splitting the transformation unit. Accordingly, significant_coeff_flag[i] indicates whether a transformation coefficient of an i-th scan index from among transformation coefficients included in a subset included in the transformation unit is 0.

According to the related art H.264, a flag (End-Of-Block) indicating whether each significant coefficient is the last significant coefficient is separately entropy encoded or decoded. However, according to an exemplary embodiment, location information of the last significant coefficient itself is entropy encoded or decoded. For example, if a location of the last significant coefficient is (x, y), where x and y are integers, last_significant_coeff_x and last_significant_coeff_y which are syntax elements indicating coordinate values of (x, y) may be entropy encoded or decoded.

In operation 1530, transformation coefficient level information indicating a size of a transformation coefficient is entropy encoded or decoded. According to the related art H.264/AVC, transformation coefficient level information is expressed by coeff_abs_level_minus1 which is a syntax element. According to exemplary embodiments, as transformation coefficient level information, coeff_abs_level_greater1_flag which is a syntax element regarding whether an absolute value of a transformation coefficient is greater than 1, coeff_abs_level_greater2_flag which is a syntax element regarding whether an absolute value of a transformation coefficient is greater than 2, and coeff_abs_level_remaining which indicates size information of the remaining transformation coefficient are encoded.

The syntax element coeff_abs_level_remaining indicating the size information of the remaining transformation coefficient has a difference in a range between a size of a transformation coefficient (absCoeff) and a base level value baseLevel that is determined by using coeff_abs_level_greater1_flag and coeff_abs_level_greater2_flag. The base level value baseLevel is determined according to the equation: baseLevel=1+coeff_abs_level_greather1_flag+coeff_abs_level_greather2_flag, and coeff_abs_level_remaining is determined according to the equation: coeff_abs_level_remaining=absCoeff−baseLevel. While coeff_abs_level_greater1_flag and coeff_abs_level_greater2_flag have a value of 0 or 1, the base level value baseLevel may have a value from 1 to 3. Accordingly, coeff_abs_level_remaining may be varied from (absCoeff−1) to (absCoeff−3). As described above, (absCoeff−baseLevel), which is a difference between the size of an original transformation coefficient absCoeff and the base level value baseLevel, is transmitted as size information of a transformation coefficient in order to reduce a size of transmitted data.

An operation of determining a context model for entropy encoding a transformation unit significant coefficient flag, according to an exemplary embodiment, will now be described.

Figure 16:
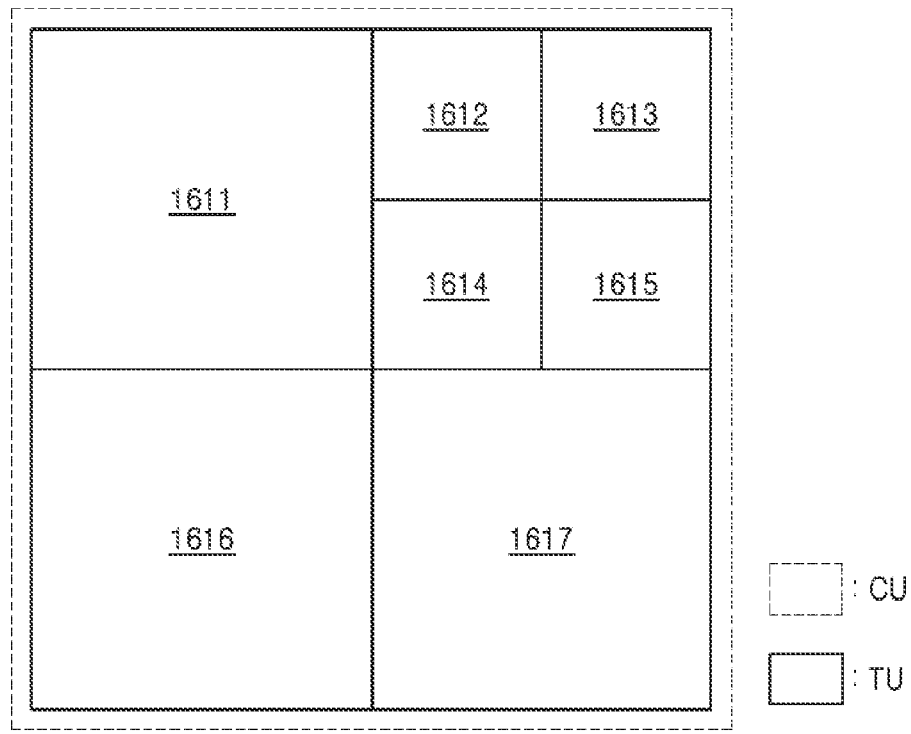
FIG. 16 is a diagram illustrating a coding unit and transformation units included in the coding unit, according to an exemplary embodiment.

FIG. 16 is a diagram illustrating a coding unit and transformation units 1611 through 1617 included in the coding unit, according to an exemplary embodiment. In FIG. 16, a data unit indicated by a dashed line denotes the coding unit (CU), and data units indicated by solid lines denote the transformation units (TU) 1611 through 1617.

As described above, the video encoding apparatus 100 and the video decoding apparatus 200 performs encoding and decoding by splitting a largest coding unit into coding units having a size equal to or less than the size of the largest coding unit. A prediction unit and a transformation unit used in a prediction operation and a transformation operation may be determined based on costs which are independent from other data units. If the size of a coding unit is greater than the size of a largest transformation unit usable by the video encoding apparatus 100 and the video decoding apparatus 200, the coding unit may be split into transformation units having a size equal to or less than the size of the largest transformation unit, and a transformation operation may be performed based on the split transformation units. For example, if the size of a coding unit is 64×64 and the size of a usable largest transformation unit is 32×32, in order to transform (or inversely transform) the coding unit, the coding unit is split into transformation units having a size equal to or less than 32×32.

A transformation depth (trafodepth) indicating the number of times the coding unit is split in horizontal and vertical directions into transformation units may be determined. For example, if the size of a current coding unit is 2N×2N and the size of the transformation unit of is 2N×2N, the transformation depth may be determined as 0. If the size of the transformation unit is N×N, the transformation depth may be determined as 1. Otherwise, if the size of the transformation unit is N/2×N/2, the transformation depth may be determined as 2.

Referring to FIG. 16, the transformation units 1611, 1616, and 1617 are level-1 transformation units obtained by splitting a root coding unit once, and have a transformation depth of 1. The transformation units 1612, 1614, 1614, and 1615 are level-2 transformation units obtained by splitting a level-1 transformation unit into four pieces, and have a transformation depth of 2.

Figure 17:
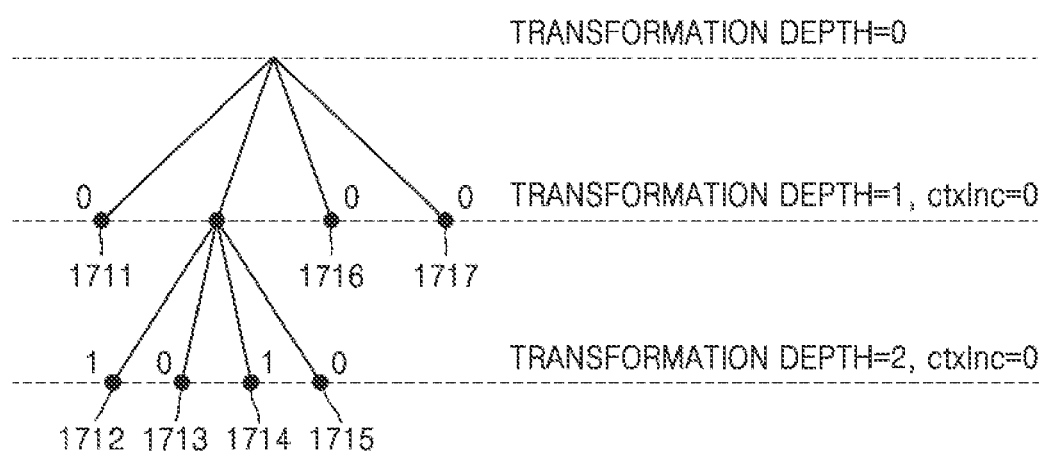
FIG. 17 is a diagram illustrating a context increasement parameter used to determine a context model of a transformation unit significant coefficient flag of each of the transformation units of FIG. 16, based on a transformation depth.

FIG. 17 is a diagram illustrating a context increasement parameter ctxInc used to determine a context model of a transformation unit significant coefficient flag cbf of each of the transformation units 1611 through 1617 of FIG. 16, based on a transformation depth. In the tree structure of FIG. 17, leaf nodes 1711 through 1717 respectively correspond to the transformation units 1611 through 1617 of FIG. 16, and values of 0 and 1 marked on the leaf nodes 1711 through 1717 indicate the transformation unit significant coefficient flags cbf of the transformation units 1611 through 1617. Also, in FIG. 17, leaf nodes having the same transformation depth are illustrated in the order of transformation units located at top left, top right, bottom left, and bottom right sides. For example, the leaf nodes 1712, 1713, 1714, and 1715 of FIG. 17 respectively correspond to the transformation units 1612, 1613, 1614, and 1615 of FIG. 16. Also, referring to FIGS. 16 and 17, it is assumed that only the transformation unit significant coefficient flags cbf of the transformation units 1612 and 1614 are 1, and that the transformation unit significant coefficient flags cbf of the other transformation units are 0.

Referring to FIG. 17, since all of the transformation units 1611 through 1617 of FIG. 16 are obtained by splitting a root coding unit and thus have non-zero transformation depths, the context increasement parameter ctxInc used to determine a context model of the transformation unit significant coefficient flag cbf of each of the transformation units 1611 through 1617 is set to have a value of 0.

Figure 18:
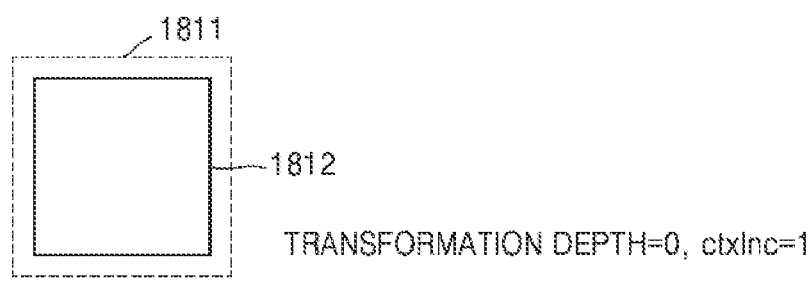
FIG. 18 is a diagram illustrating a coding unit and a transformation unit included in the coding unit, according to another exemplary embodiment.

FIG. 18 is a diagram illustrating a coding unit 1811 and a transformation unit 1812 included in the coding unit 1811, according to another exemplary embodiment. In FIG. 18, a data unit indicated by a dashed line denotes the coding unit 1811, and a data unit indicated by a solid line denotes the transformation unit 1812.

Referring to FIG. 18, if the size of the coding unit 1811 is equal to the size of the transformation unit 1812 used to transform the coding unit 1811, a transformation depth (trafodepth) of the transformation unit 1812 has a value of 0. If the transformation unit 1812 has a transformation depth of 0, a context increasement parameter ctxInc used to determine a context model of a transformation unit significant coefficient flag cbf of the transformation unit 1812 is set to have a value of 1.

The context modeler 1420 of FIG. 14 may compare the size of a coding unit to the size of a transformation unit based on a transformation depth of the transformation unit, may distinguish a case when the transformation depth of the transformation unit is 0 from a case when the transformation depth of the transformation unit is not 0, and thus may change the context increasement parameter ctxInc used to determine a context model for entropy encoding the transformation unit significant coefficient flag cbf. By changing the context increasement parameter ctxInc used to determine a context model, the context model for entropy encoding the transformation unit significant coefficient flag cbf may be changed in a case when the transformation depth of the transformation unit is 0 and a case when the transformation depth of the transformation unit is not 0.

Figure 19:
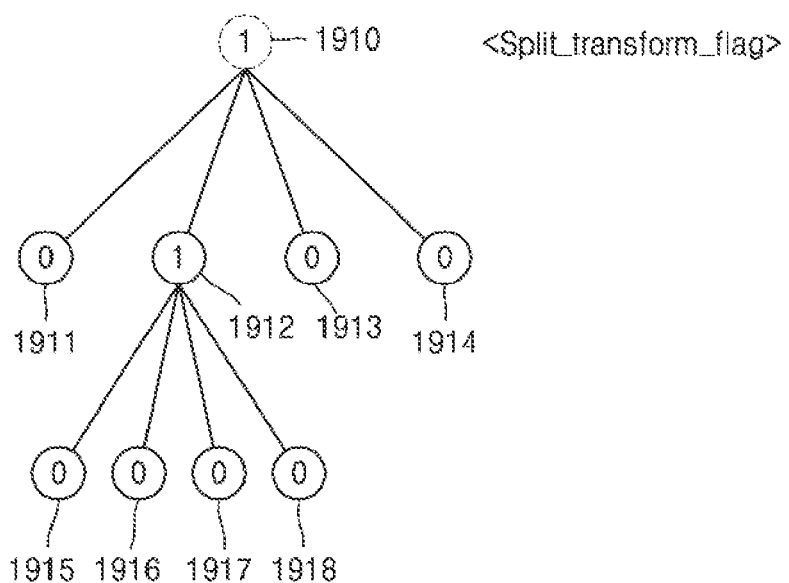
FIG. 19 is a diagram illustrating split transformation flags used to determine the structure of transformation units included in the coding unit of FIG. 16, according to an exemplary embodiment.

FIG. 19 is a diagram illustrating split transformation flags split_transform_flag used to determine the structure of transformation units included in the coding unit of FIG. 16, according to an exemplary embodiment.

The video encoding apparatus 100 may signal information about the structure of transformation units used to transform each coding unit, to the video decoding apparatus 200. The information about the structure of transformation units may be signaled by using the split transformation flag split_transform_flag indicating whether each coding unit is split in horizontal and vertical directions into four transformation units.

Referring to FIGS. 16 and 19, since a root coding unit is split into four pieces, a split transformation flag split_transform_flag 1910 of the root coding unit is set as 1. If the size of the root coding unit is greater than the size of a usable largest transformation unit, the split transformation flag split_transform_flag 1910 of the root coding unit may always be set as 1 and may not be signaled. Therefore, if the size of a coding unit is greater than the size of a usable largest transformation unit, the coding unit does not need to be split into deeper coding units having a size equal to or less than the size of at least a largest transformation unit.

With respect to each of the four transformation units split from the root coding unit had having a transformation depth of 1, a split transformation flag indicating whether to split each of the four transformation units into four transformation units having a transformation depth of 2 is set. In FIG. 19, split transformation flags of the transformation units having the same transformation depth are illustrated in the order of the transformation units located at top left, top right, bottom left, and bottom right sides. A reference numeral 1911 denotes a split transformation flag of the transformation unit 1611 of FIG. 16. Since the transformation unit 1611 is not split into transformation units having a lower depth, the split transformation flag 1911 of the transformation unit 1611 has a value of 0. Likewise, since the transformation units 1616 and 1617 of FIG. 16 are not split into transformation units having a lower depth, split transformation flags 1913 and 1914 of the transformation units 1616 and 1617 have a value of 0. Since the top right transformation unit having a transformation depth of 1 in FIG. 16 is split into the transformation units 1612, 1613, 1614, and 1615 having a transformation depth of 2, a split transformation flag 1912 of the top right transformation unit has a transformation depth of 1. Since the transformation units 1612, 1613, 1614, and 1615 having a transformation depth of 2 are not split into transformation units having a lower depth, split transformation flags 1915, 1916, 1917, and 1918 of the transformation units 1612, 1613, 1614, and 1615 having a transformation depth of 2 have a value of 0.

As described above, a context model for entropy encoding a transformation unit significant coefficient flag cbf may be determined based on a transformation depth of a transformation unit, and binary arithmetic encoding may be performed on the transformation unit significant coefficient flag cbf based on the selected context model. If the transformation unit significant coefficient flag cbf is 0, since only 0 transformation coefficients exist in a current transformation unit, only a value of 0 is entropy encoded or decoded as the transformation unit significant coefficient flag cbf, and transformation coefficient level information is not entropy encoded or decoded.

An operation of entropy encoding a syntax element related to transformation coefficients included in a transformation unit of which a transformation unit significant coefficient flag cbf has a value of 1, that is, a transformation unit having a non zero transformation coefficient, will now be described.

Figure 20:
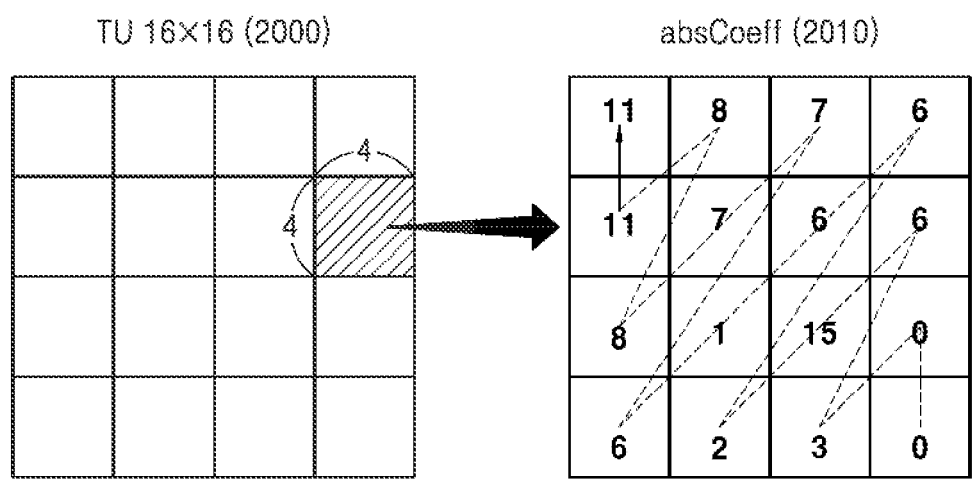
FIG. 20 illustrates a transformation unit that is entropy encoded according to an exemplary embodiment.

FIG. 20 illustrates a transformation unit 2000 that is entropy encoded according to an exemplary embodiment. While the transformation unit 2000 having a 16×16 size is illustrated in FIG. 20, the size of the transformation unit 2000 is not limited to the illustrated size of 16×16 but may also be of various sizes ranging from 4×4 to 32×32.

Referring to FIG. 20, for entropy encoding and decoding of the transformation coefficient included in the transformation unit 2000, the transformation unit 2000 may be divided into smaller transformation units. An operation of entropy encoding a syntax element related to a 4×4 transformation unit 2010 included in the transformation unit 2000 will now be described. This entropy encoding operation may also be applied to a transformation unit of different sizes.

Transformation coefficients included in the 4×4 transformation unit 2010 each have a transformation coefficient (absCoeff) as illustrated in FIG. 20. The transformation coefficients included in the 4×4 transformation unit 2010 may be serialized according to a predetermined scanning order as illustrated in FIG. 20 and sequentially processed. However, the scanning order is not limited as illustrated but may also be modified.

Examples of syntax elements related to transformation coefficients included in the 4×4 transformation unit 2010 are significant_coeff_flag which is a syntax element indicating whether each transformation coefficient included in a transformation unit is a significant coefficient having a value that is not 0, coeff_abs_level_greater1_flag which is a syntax element indicating whether an absolute value of the transformation coefficient is greater than 1, coeff_abs_level_greater2_flag which is a syntax element indicating whether the absolute value s greater than 2, and coeff_abs_level_remaining which is a syntax element indicating size information of the remaining transformation coefficients.

FIG. 21 illustrates a significance map SigMap 2100 corresponding to the transformation unit 2010 of FIG. 20.

Referring to FIGS. 20 and 21, the significance map SigMap 2100 having a value of 1 for each of the significant coefficients that have a value that is not 0, from among the transformation coefficients included in the 4×4 transformation unit 2010 of FIG. 20, is set. The significance map SigMap 2100 is entropy encoded or decoded by using a previously set context model.

FIG. 22 illustrates coeff_abs_level_greater1_flag 2200 corresponding to the 4×4 transformation unit 2010 of FIG. 20.

Referring to FIGS. 20 through 22, the coeff_abs_level_greater1_flag 2200 which is a flag indicating whether a corresponding significance transformation coefficient has a value greater than 1, regarding significant coefficients for which the significance map SigMap 2100 has a value of 1, is set. When the coeff_abs_level_greater1_flag 2200 is 1, it indicates that a corresponding transformation coefficient is a transformation coefficient having a value greater than 1, and when the coeff_abs_level_greater1_flag 2200 is 0, it indicates that a corresponding transformation coefficient is a transformation coefficient having a value of 1. In FIG. 22, when coeff_abs_level_greater1_flag 2210 is at a location of a transformation coefficient having a value of 1, the coeff_abs_level_greater1_flag 2210 has a value of 0.

FIG. 23 illustrates coeff_abs_level_greater2_flag 2300 corresponding to the 4×4 transformation unit 2010 of FIG. 20.

Referring to FIGS. 20 through 23, coeff_abs_level_greater2_flag 2300 indicating whether a corresponding transformation coefficient has a value greater than 2, regarding transformation coefficients for which the coeff_abs_level_greater1_flag 2200 is set to 1, is set. When the coeff_abs_level_greater2_flag 2300 is 1, it indicates that a corresponding transformation coefficient is a transformation coefficient having a value greater than 2, and when the coeff_abs_level_greater2_flag 2300 is 0, it indicates that a corresponding transformation coefficient is a transformation coefficient having a value of 2. In FIG. 23, when coeff_abs_level_greater2_flag 2310 is at a location of a transformation coefficient having a value of 2, the coeff_abs_level_greater2_flag 2310 has a value of 0.

FIG. 24 illustrates coeff_abs_level_remaining 2400 corresponding to the 4×4 transformation unit 2010 of FIG. 20.

Referring to FIGS. 20 through 24, the coeff_abs_level_remaining 2400 which is a syntax element indicating size information of the remaining transformation coefficients may be obtained by calculating (absCoeff−baseLevel) of each transformation coefficient.

The coeff_abs_level_remaining 2400 which is the syntax element indicating size information of the remaining transformation coefficients has a difference in a range between the size of the transformation coefficient (absCoeff) and a base level value baseLevel determined by using coeff_abs_level_greater1_flag and coeff_abs_level_greater2_flag. The base level value baseLevel is determined according to the equation below:

baseLevel=1+coeff_abs_level_greather1_flag+coeff_abs_level_greather2_flag, and coeff_abs_level_remaining is determined according to the equation: coeff_abs_level_remaining=absCoeff−baseLevel.

The coeff_abs_level_remaining 2400 may be read and entropy encoded according to the illustrated scanning order.

Figure 25:
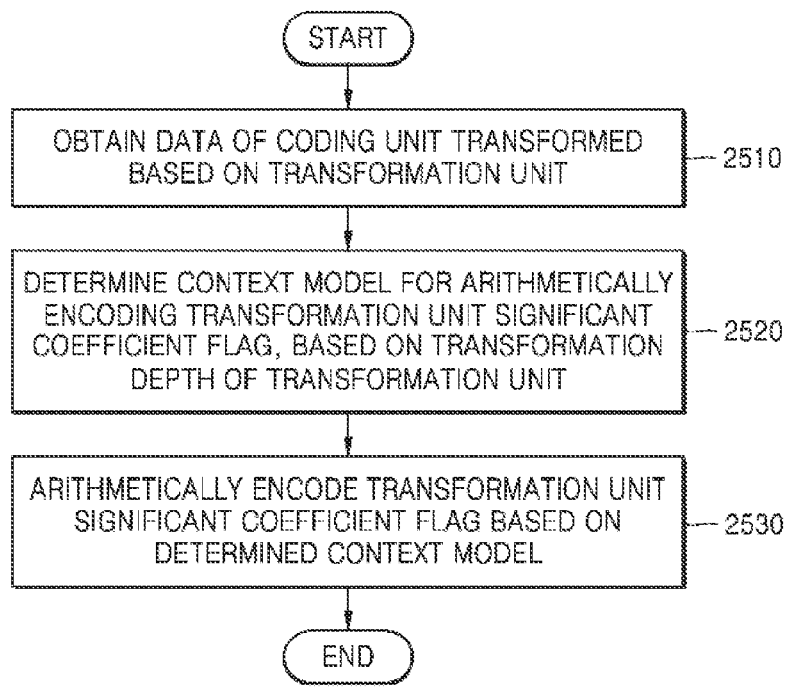
FIG. 25 is a flowchart of an entropy encoding method of a video, according to an exemplary embodiment.

FIG. 25 is a flowchart of an entropy encoding method of a video, according to an exemplary embodiment.

Referring to FIGS. 14 and 25, in operation 2510, the context modeler 1420 obtains data of a coding unit transformed based on a transformation unit. In operation 2520, the context modeler 1420 determines a context model for arithmetically encoding a transformation unit significant coefficient flag indicating whether a non-zero transformation coefficient exists in the transformation unit, based on a transformation depth of the transformation unit.

The context modeler 1420 may determine different context models in a case when the size of the transformation unit equals to the size of the coding unit, that is, when the transformation depth of the transformation unit is 0, and a case when the size of the transformation unit is less than the size of the coding unit, that is, when the transformation depth of the transformation unit is not 0. In more detail, the context modeler 1420 may change a context increasement parameter ctxInc for determining a context model, based on the transformation depth of the transformation unit, may distinguish a case when the transformation depth of the transformation unit is 0 from a case when the transformation depth of the transformation unit is not 0, and thus may change a context index ctxIdx for determining a context model for entropy encoding a transformation unit significant coefficient flag.

The transformation unit significant coefficient flag may be separately set according to luma and chroma components. A context model for entropy encoding a transformation unit significant coefficient flag cbf_luma of the transformation unit of the luma component may be determined by using the context increasement parameter ctxInc changed according to whether the transformation depth of the transformation unit is 0. A context model for entropy encoding a transformation unit significant coefficient flag cbf_cb or cbf_cr of the transformation unit of the chroma component may be determined by using a value of the transformation depth (trafodepth) as the context increasement parameter ctxInc.

In operation 2530, the regular coding engine 1432 arithmetically encodes the transformation unit significant coefficient flag based on the determined context model.

Figure 26:
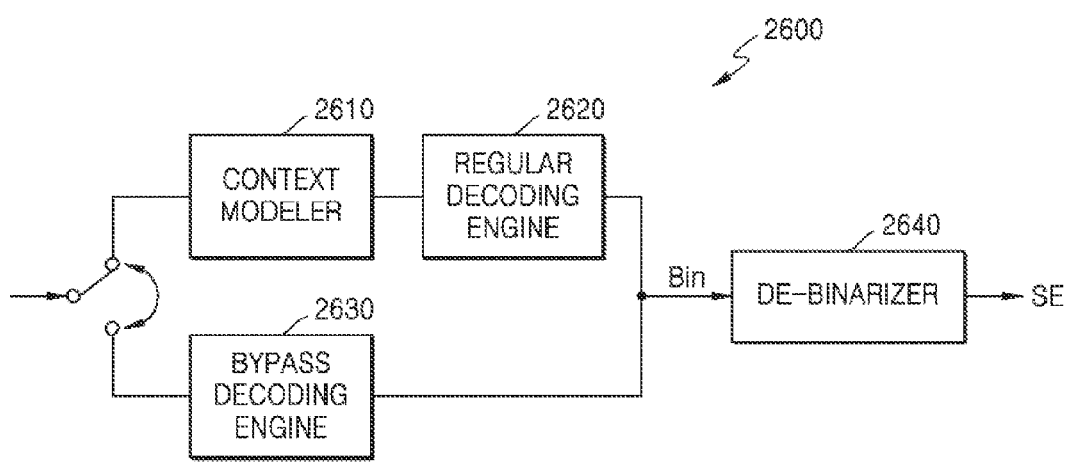
FIG. 26 is a block diagram of an entropy decoding apparatus according to an exemplary embodiment.

FIG. 26 is a block diagram of an entropy decoding apparatus 2600 according to an exemplary embodiment. The entropy decoding apparatus 2600 corresponds to the entropy decoder 220 of the video decoding apparatus 200 of FIG. 2. The entropy decoding apparatus 2600 performs an inverse operation of the entropy encoding operation performed by the entropy encoding apparatus 1400 described above.

Referring to FIG. 26, the entropy decoding apparatus 2600 includes a context modeler 2610, a regular decoding engine 2620, a bypass decoding engine 2630, and a de-binarizer 2640.

A syntax element encoded by using bypass coding is output to the bypass decoder 2630 to be arithmetically decoded, and a syntax element encoded by using regular coding is arithmetically decoded by the regular decoder 2620. The regular decoder 2620 arithmetically decodes a binary value of a current syntax element based on a context model provided by using the context modeler 2610 to thereby output a bit string.

Like the above-described context modeler 1420 of FIG. 14, the context modeler 2610 may select a context model for entropy decoding a transformation unit significant coefficient flag cbf, based on a transformation depth of a transformation unit. That is, the context modeler 2610 may determine different context models in a case when the size of the transformation unit equals to the size of a coding unit, that is, when the transformation depth of the transformation unit is 0, and a case when the size of the transformation unit is less than the size of the coding unit, that is, when the transformation depth of the transformation unit is not 0. In more detail, the context modeler 2610 may change a context increasement parameter ctxInc for determining a context model, based on the transformation depth of the transformation unit, may distinguish a case when the transformation depth of the transformation unit is 0 from a case when the transformation depth of the transformation unit is not 0, and thus may change a context index ctxIdx for determining a context model for entropy decoding the transformation unit significant coefficient flag cbf.

If the structure of transformation units included in a coding unit is determined based on a split transformation flag split_transform_flag indicating whether a coding unit obtained from a bitstream is split into the transformation units, the transformation depth of the transformation unit may be determined based on the number of times the coding unit is split to reach the transformation unit.

The transformation unit significant coefficient flag cbf may be separately set according to luma and chroma components. A context model for entropy decoding a transformation unit significant coefficient flag cbf_luma of the transformation unit of the luma component may be determined by using the context increasement parameter ctxInc that changes according to whether the transformation depth of the transformation unit is 0. A context model for entropy decoding a transformation unit significant coefficient flag cbf_cb or cbf_cr of the transformation unit of the chroma component may be determined by using a value of the transformation depth (trafodepth) as the context increasement parameter ctxInc.

The de-binarizer 2640 reconstructs bit strings that are arithmetically decoded by the regular decoding engine 2620 or the bypass decoding engine 2630, to syntax elements again.

The entropy decoding apparatus 2600 arithmetically decodes syntax elements related to transformation units, such as coeff_abs_level_remaining, SigMap, coeff_abs_level_greater1_flag, and coeff_abs_level_greater2_flag in addition to the transformation unit significant coefficient flag cbf, and outputs the same. When the syntax elements related to a transformation unit are reconstructed, data included in the transformation units may be decoded by using inverse quantization, inverse transformation, and predictive decoding, based on the reconstructed syntax elements.

Figure 27:
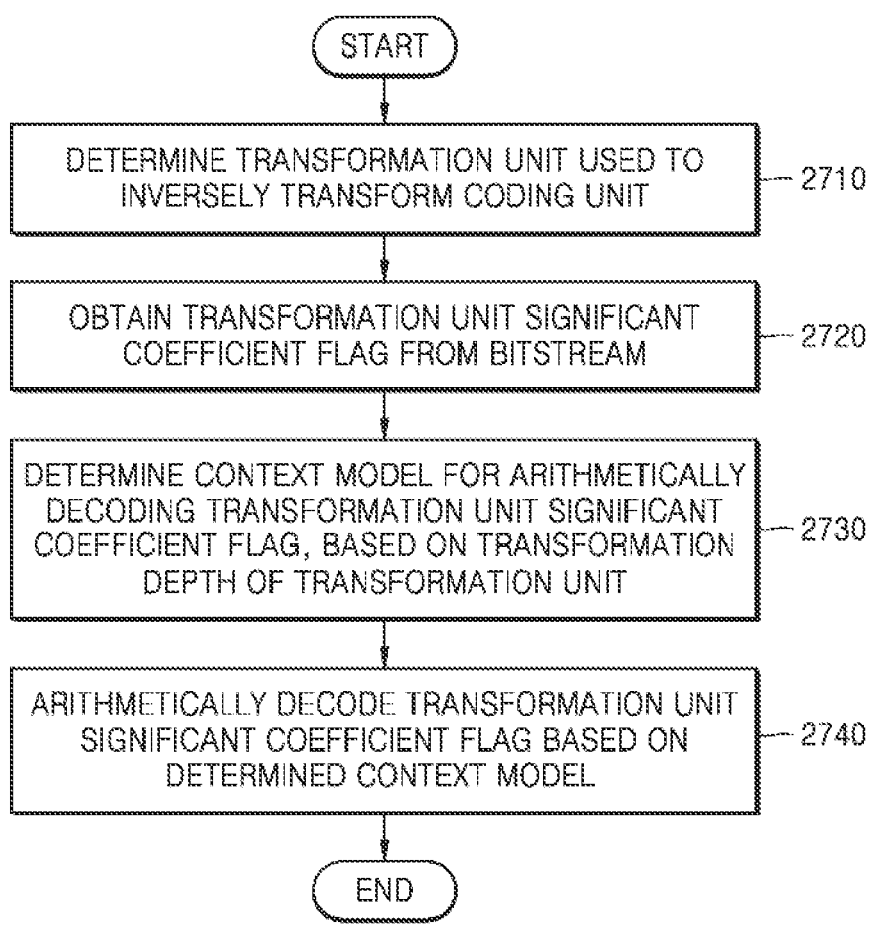
FIG. 27 is a flowchart of an entropy decoding method of a video, according to an exemplary embodiment.

FIG. 27 is a flowchart of an entropy decoding method of a video, according to an exemplary embodiment.

Referring to FIG. 27, in operation 2710, a transformation unit included in a coding unit and used to inversely transform the coding unit is determined. As described above, the structure of transformation units included in a coding unit may be determined based on a split transformation flag split_transform_flag indicating whether the coding unit obtained from a bitstream is split into transformation units. Also, a transformation depth of the transformation unit may be determined based on the number of times that the coding unit is split to reach the transformation unit.

In operation 2720, the context modeler 2610 obtains a transformation unit significant coefficient flag indicating whether a non-zero transformation coefficient exists in the transformation unit, from the bitstream.

In operation 2730, the context modeler 2610 determines a context model for arithmetically decoding the transformation unit significant coefficient flag, based on the transformation depth of the transformation unit. As described above, the context modeler 2610 may determine different context models in a case when the size of the transformation unit equals to the size of the coding unit, that is, when the transformation depth of the transformation unit is 0, and a case when the size of the transformation unit is less than the size of the coding unit, that is, when the transformation depth of the transformation unit is not 0. In more detail, the context modeler 2610 may change a context increasement parameter ctxInc for determining a context model, based on the transformation depth of the transformation unit, may distinguish a case when the transformation depth of the transformation unit is 0 from a case when the transformation depth of the transformation unit is not 0, and thus may change a context index ctxIdx for determining a context model for entropy decoding a transformation unit significant coefficient flag.

In operation 2740, the regular decoding engine 2620 arithmetically decodes the transformation unit significant coefficient flag based on the context model provided from the context modeler 2610.

The above exemplary embodiments can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A decoding method of a video, the method comprising:

obtaining a split transformation flag for a current depth, from a bitstream;

when the split transformation flag indicates a non-split for the current depth, determining that a transformation depth is equal to the current depth;

determining a context increasement parameter for determining a context index based on whether the transformation depth is equal to a predetermined value without using a size of a transformation unit;

obtaining a context model for a transformation unit significant coefficient flag among a plurality of context models using the context index obtained by adding the context increasement parameter and a context offset; and arithmetic decoding the transformation unit significant coefficient flag based on the context model; and determining whether at least one non-zero transformation coefficient exists in the transformation unit of the transformation depth, based on the transformation unit significant flag, wherein the transformation depth of the transformation unit indicates a number of times a coding unit is split, wherein the context model is determined according to whether a value of the transformation depth is equal to zero, and wherein, when the split transformation flag indicates split for the current depth, splitting a transformation unit of the current depth is split into one or more transformation units of a next depth, and obtaining a split transformation flag for the next depth from the bitstream.

* * * * *